(12) United States Patent
Kunimune et al.

(10) Patent No.: US 8,051,270 B2
(45) Date of Patent: Nov. 1, 2011

(54) MEMORY CONTROLLER, NONVOLATILE STORAGE DEVICE, NONVOLATILE STORAGE SYSTEM, AND MEMORY CONTROL METHOD

(75) Inventors: Daisuke Kunimune, Kyoto (JP); Masahiro Nakanishi, Kyoto (JP); Manabu Inoue, Osaka (JP); Tomoaki Izumi, Osaka (JP); Tetsushi Kasahara, Osaka (JP); Kazuaki Tamura, Osaka (JP); Kiminori Matsuno, Osaka (JP)

(73) Assignee: Panasonic Corporation, Osaka (JP)

( * ) Notice: Subject to any disclaimer, the term of this patent is extended or adjusted under 35 U.S.C. 154(b) by 729 days.

(21) Appl. No.: 11/914,989

(22) PCT Filed: May 18, 2006

(86) PCT No.: PCT/JP2006/309933
§ 371 (c)(1),
(2), (4) Date: Jan. 24, 2008

(87) PCT Pub. No.: WO2006/126445
PCT Pub. Date: Nov. 30, 2006

(65) Prior Publication Data
US 2008/0168252 A1    Jul. 10, 2008

(30) Foreign Application Priority Data

May 23, 2005    (JP) .................................. 2005-149047

(51) Int. Cl.
*G06F 12/06*    (2006.01)

(52) U.S. Cl. ... 711/173; 711/103; 711/170; 711/E12.001
(58) Field of Classification Search .................. 711/103, 711/170, 173
See application file for complete search history.

(56) References Cited

U.S. PATENT DOCUMENTS

| | | | |
|---|---|---|---|
| 6,098,077 A * | 8/2000 | Sassa | 1/1 |
| 6,377,500 B1 * | 4/2002 | Fujimoto et al. | 365/230.01 |
| 2004/0111553 A1 * | 6/2004 | Conley | 711/103 |
| 2005/0144360 A1 * | 6/2005 | Bennett et al. | 711/103 |

* cited by examiner

*Primary Examiner* — Kenneth Lo
(74) *Attorney, Agent, or Firm* — Greenblum & Bernstein, P.L.C.

(57) ABSTRACT

A memory controller for reducing a time to create an address management table during initialization of a memory card. The memory controller includes a read-write memory for temporarily storing the address management table and a second memory controller for writing, in a nonvolatile memory, an address management table temporarily stored in the read-write memory. The second memory controller also writes address range specifying information that specifies an address range, when a data writing destination is changed from a first address range to a second address range. The memory controller includes an address management table generator for reading distributed management information used for managing a state of at least one physical block included in the destination address range specified by the address range specifying information during initialization, and to generate the address management table based on the distributed management information.

3 Claims, 21 Drawing Sheets

| PHYSICAL BLOCK NUMBER | BLOCK STATUS | |
|---|---|---|
| 0 | 0 | 0 |
| | 1 | 0 |
| ⋮ | ⋮ | ⋮ |
| 4095 | 1 | 1 |

| PHYSICAL BLOCK NUMBER | BLOCK STATUS | |
|---|---|---|
| 0 | 0 | 0 |
| | 1 | 0 |
| ⋮ | ⋮ | ⋮ |
| 32767 | 1 | 1 |

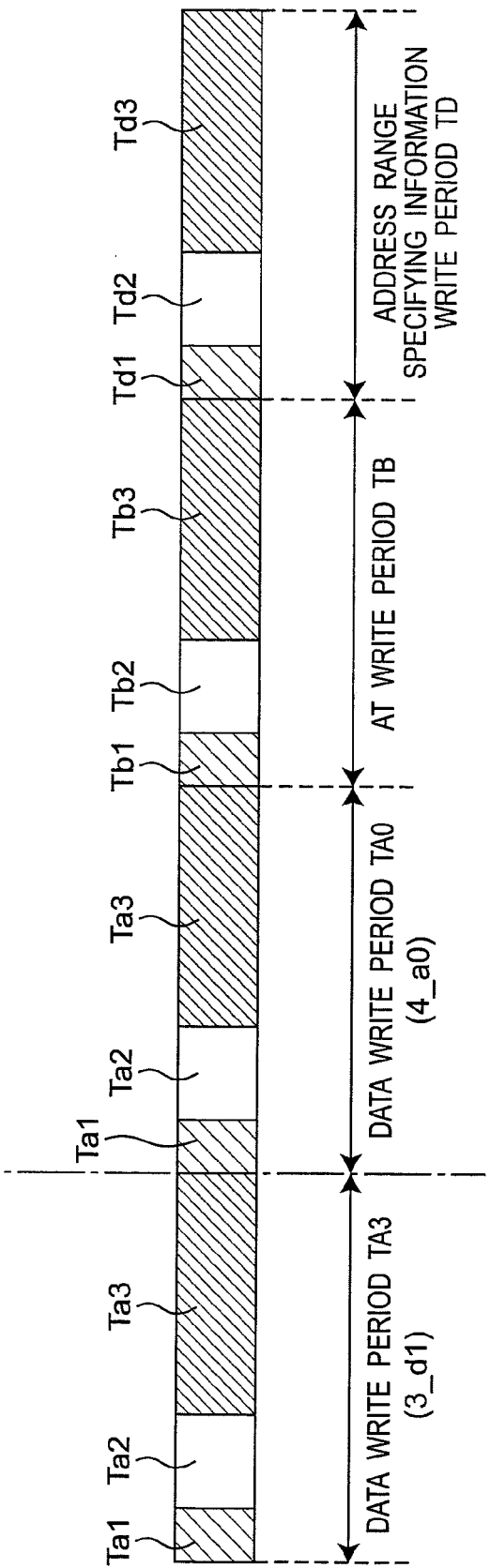

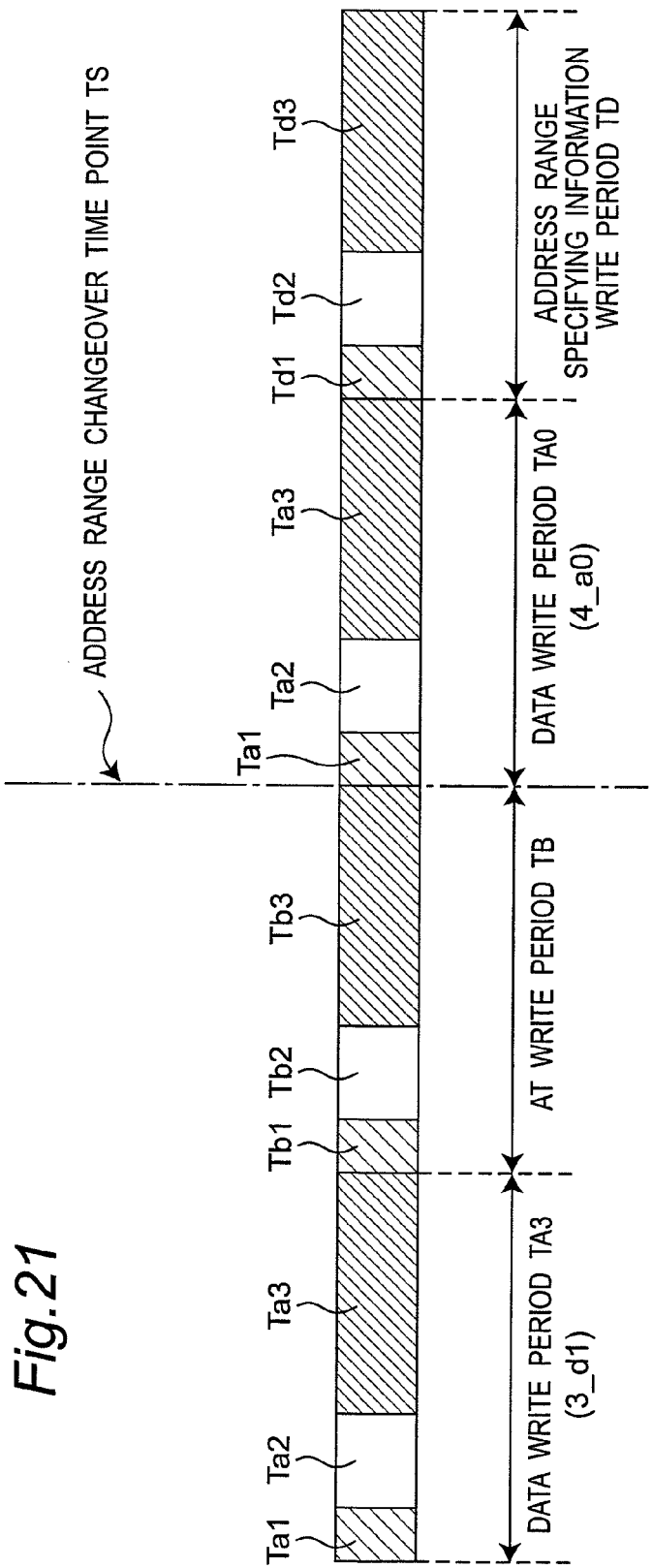

MEMORY CONTROLLER, NONVOLATILE STORAGE DEVICE, NONVOLATILE STORAGE SYSTEM, AND MEMORY CONTROL METHOD

TECHNICAL FIELD

The invention relates to a nonvolatile storage device such as a semiconductor memory card having a flash memory as a main storage memory, a memory controller incorporated therein, a nonvolatile storage system including the nonvolatile storage device and an access device, and a memory control method.

BACKGROUND ART

A nonvolatile storage device including a re-writable nonvolatile memory is increasing in its demand mainly for use in semiconductor memory card. A nonvolatile storage system using the semiconductor memory card is also increasing in its demand mainly for use in digital still camera and personal computer.

A practical semiconductor memory card usually includes a flash memory as a nonvolatile memory and a controller LSI as its control circuit, inside. Recently, in the trend of larger capacity of semiconductor memory card, the nonvolatile memory chip is also increased in capacity by multiple-value configuration. Owing to the progress in mounting technology, the number of chips of nonvolatile memory mounted on the semiconductor memory card is increasing. For example, the memory space of semiconductor memory card is exceeding 1 GB.

As address management method for semiconductor memory card, a distributed management method has been used in the prior art. The "distributed management method" is a method of storing, in a management area of a page being a writing unit, a logical address or a status flag of its page, and generating an address management table based on the logical address or the status flag of page to store the address management table in the RAM in the controller LSI at the time of initialization. The logical address or the status flag of page is collectively called "distributed management information".

However, in the semiconductor memory card having a memory space of large capacity, a much time is taken for reading out distributed management information of the whole memory space at the time of initialization. As a result, it may exceed the upper limit of standard initialization time in the semiconductor memory card, or cause other violation of standard. In particular, in a semiconductor memory card not specified by standard, if not violating the standard, the user suffers a huge demerit due to waiting time until accessible. Still more, the capacity of RAM for temporarily storing the address management table or the like is enormous, and there is a problem of cost.

To avoid such problems, a "centralized management method" is proposed, and its technology is disclosed in patent document 1. In the nonvolatile storage device of patent document 1, an address space of nonvolatile memory mounted on the semiconductor memory card is divided into a plurality of address ranges, a plurality of address management tables corresponding to the address ranges are stored in the nonvolatile memory, and the corresponding address management table is read out into the RAM depending on the write or erase command in specified logical address from a host.

Patent document 2 discloses a method of employing both distributed management method and centralized management method of storing collectively address management tables in the nonvolatile memory. The method and apparatus disclosed in patent document 2 are not intended to write back the address management table to the nonvolatile memory on every write command from the host or access device, but are intended to write back the address management table to the nonvolatile memory at a specified timing free of access such as power off, and judge the efficacy of address management table at the time of initialization, and to use the address management table if effective, or generate an address management table based on distributed management information if not effective.

Patent document 1: JP-A-2001-142774
Patent document 2: JP-A-11-73379

DISCLOSURE OF INVENTION

Problem to be Solved by the Invention

In patent document 1, only the address management table is read out from the nonvolatile memory at the time of initialization, and the process of initialization is finished in a short time. However, to deal with trouble such as power shutdown, usually, the address management table on the RAM is updated at every write or erase command to a specified logical address from the host, and the updated address management table must be written back to the nonvolatile memory after writing or erasing of user data. This method is, as compared with the above-mentioned distributed management method, lower in the access speed by the time required for writing back the address management table.

In patent document 2, since the address management table is written back in the nonvolatile memory at a specified timing free of access, the access speed in writing data is not lowered. However, if the address management table is not correctly written back into the nonvolatile memory due to power shutdown or other trouble, it is required to generate the address management table based on the distributed management information of whole region of nonvolatile memory at the time of initialization. As a result, in the event of trouble such as power shutdown, the initialization time still becomes longer.

The invention is devised in view of such problems of prior arts, and it is hence an object to eliminate lowering of access speed due to write back of address management table during normal operation and to reduce the time required for creating an address management table at the time of initialization even in the event of trouble such as power shutdown.

Means to Solve the Problems

The present invention is a memory controller that writes or reads data in or from a nonvolatile memory having a plurality of address ranges each of which includes one or more physical blocks. The memory controller includes a read-write memory that temporarily stores an address management table for managing states of the physical blocks, a memory control unit that writes, in the physical block, data and distributed management information used for generating the address management table and updates the address management table of the read-write memory when writing data, and writes, in the nonvolatile memory, the address management table temporarily stored in the read-write memory when a data writing destination changes over from one address range to other address range, and an address management table generation unit that reads out the distributed management information from the address range which is accessed before initialization, at the time of the initialization, and generates the address management table on the read-write memory based on the read-out distributed management information.

According to the invention, at the time of initialization, it is not necessary to investigate the distributed management information in whole region of nonvolatile memory, and the creation time of address management table at the time of initialization can be shortened. Further, it is not required to write back the address management table in the nonvolatile memory at every write command from the access device, and lowering of access speed due to writing back of address management table in usual operation can be avoided.

Each address range may be a storage area of a specified size made by dividing a storage area of the nonvolatile memory into a plurality of storage areas, and includes a plurality of physical blocks corresponding to a plurality of logical units specified by an access device. The address management table may be a table for managing collectively a plurality of logical units included in the address range.

Each address range may be an area provided for each logical unit specified by an access device, and the address management table may be a table for managing collectively a plurality of address ranges.

The memory control unit may write, in the nonvolatile memory, the address range specifying information for specifying the switching destination address range when a physical block of data write destination changes from one address range to other address range.

The memory control unit may write the address range specifying information in the nonvolatile memory with the address range specifying information incorporated in the address management table.

The memory control unit may specify the address range which is accessed before initialization, based on the address range specifying information, at the time of the initialization.

It is other aspect of the invention to present a memory controller that writes or reads data in or from a nonvolatile memory having a plurality of address ranges each of which includes one or more physical blocks, and this memory controller includes a read-write memory that temporarily stores an address management table including a first table and a second table, the first table managing a writing states of physical blocks in one address range, the second table managing the states of physical blocks in a plurality of address ranges, a memory control unit that writes, in the nonvolatile memory, data and distributed management information used for generating the address management table and updates the address management table of the read-write memory when writing data, writes, in the nonvolatile memory, the address management table temporarily stored in the read-write memory when a data writing destination changes over from one address range to other address range, and reads out the second table from the nonvolatile memory to store the second table into the read-write memory at the time of initialization, and an address management table generation unit that reads out the distributed management information from the address range which is accessed before initialization, at the time of the initialization, generates the first table based on the read-out distributed management information and stores the first table in the read-write memory.

A nonvolatile storage device of the invention includes a nonvolatile memory having a plurality of address ranges each of which includes one or more physical blocks, and the memory controller that controls writing or reading of data in or from the nonvolatile memory.

A nonvolatile storage system of the invention includes the nonvolatile storage device including a nonvolatile memory having a plurality of address ranges each of which includes one or more physical blocks, and an access device that controls writing or reading of data in or from the nonvolatile memory by specifying the address range.

A memory control method of the invention is a memory control method that controls a nonvolatile storage device including a nonvolatile memory having a plurality of address ranges each of which includes one or more physical blocks, and a read-write memory that temporarily stores an address management table for managing a state of the physical block, and the memory control method includes writing, in the physical block, data and distributed management information used for generating the address management table and updates the address management table of the read-write memory when writing data, and writing, in the nonvolatile memory, the address management table temporarily stored in the read-write memory when a data writing destination changes over from one address range to other address range, and reading out the distributed management information from the address range which is accessed before initialization, to generate the address management table on the read-write memory based on the read-out distributed management information, at the time of the initialization.

EFFECTS OF THE INVENTION

According to the invention, time required for creating an address management table at the time of initialization can be shortened, while eliminating lowering of access speed due to process of writing back the address management table during normal operation.

BRIEF DESCRIPTION OF DRAWINGS

FIG. 6 shows a physical area management table in first embodiment.

FIG. 16 shows a physical area management table in second embodiment.

FIG. 20 is a diagram showing a write sequence when address range is changed in second embodiment.

FIG. 21 is diagram showing other write sequence when address range is changed in second embodiment.

DESCRIPTION OF REFERENCE NUMERALS

Figure 1:
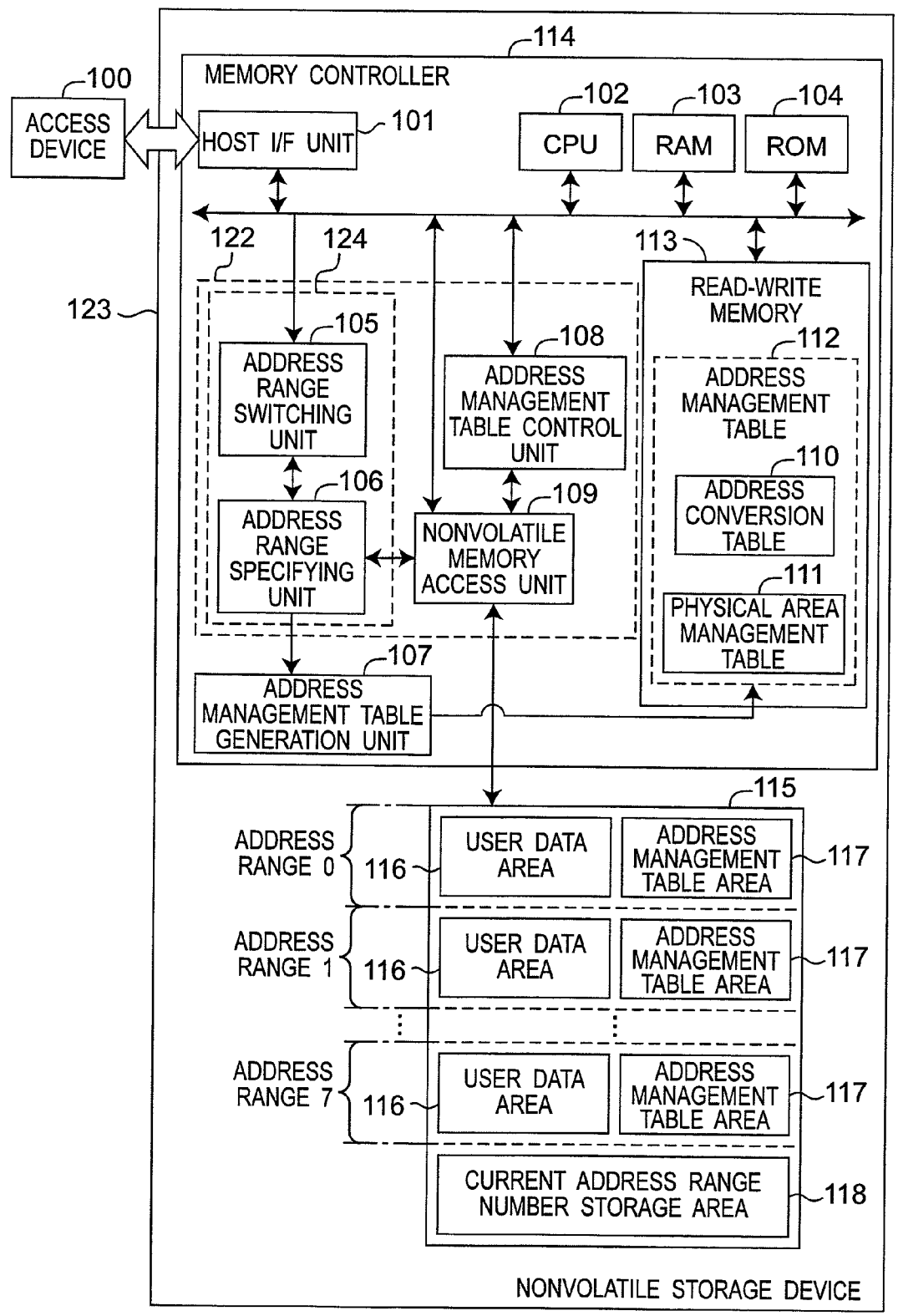
FIG. 1 is a block diagram of nonvolatile storage system in first embodiment of the invention.

100 Access device
101 Host I/F unit
102 CPU
103 RAM
104 ROM
105 Address range switching unit
106 Address range specifying unit
107 Address management table generation unit
108 Address management table control unit
109 Nonvolatile memory access unit
110 Address conversion table
111 Physical area management table
112 Address management table
113 Read-write memory
114 Memory controller
115 Nonvolatile memory
116 User data area
117 Address management table area
118 Current address range number storage area
122 Memory control unit
123 Nonvolatile storage device
124 Address range control unit
1110 Address conversion table
1111 Physical area management table
1112 Address management table
1115 Nonvolatile memory
1116 User data area
1117 Address management table area
1121 Write control table

BEST MODE FOR CARRYING OUT THE INVENTION

Embodiments showing the best mode for carrying out the invention are described below by referring to the accompanying drawings.

First Embodiment

FIG. 1 shows a configuration of nonvolatile storage system in the embodiment. The nonvolatile storage system in the embodiment includes an access device 100, and a nonvolatile storage device 123 that operates according to a read or write command of user data (or "data") sent from the access device 100.

The nonvolatile storage device 123 includes a nonvolatile memory 115 that stores the data transferred from the access device 100, and a memory controller 114 that controls the nonvolatile memory 115 based on a read or write command and a logical address sent from the access device 100. The storage area of the nonvolatile memory 115 is divided into a plurality of address ranges.

[Internal Configuration of Memory Controller]

The memory controller 114 has a host interface unit (hereafter, referred to as "host I/F unit") 101, a RAM 103 for work, a ROM 104 storing a program, and a CPU 102 that controls the whole memory controller 114 by using the work RAM 103 and the program stored in the ROM 104.

The memory controller 114 further includes a memory control unit 122 that controls the nonvolatile memory 115, an address management table generation unit 107 that generates an address management table 112, and a read-write memory 113 that temporarily stores the address management table 112.

The memory control unit 122 has an address range control unit 124 that judges changeover of address range of the nonvolatile memory 115, a nonvolatile memory access unit 109 that controls reading or writing of data in the nonvolatile memory 115, and an address management table control unit 108 that writes the address management table 112 temporarily stored in the read-write memory 113 into the nonvolatile memory 115 by way of the nonvolatile memory access unit 109.

[Configuration of Storage Area of Nonvolatile Memory]

Figure 2:
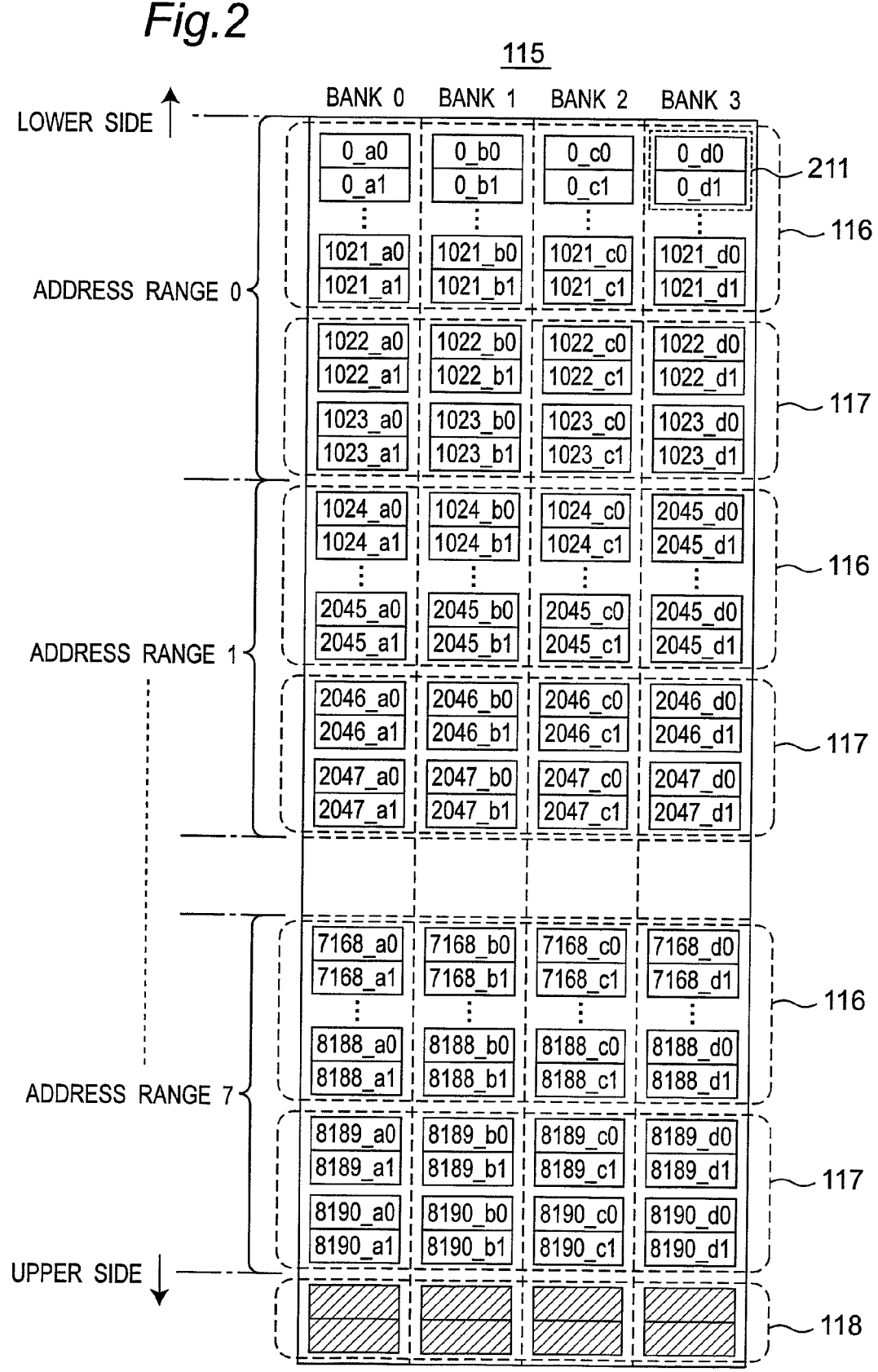
FIG. 2 is an internal configurational diagram of nonvolatile memory in first embodiment.

FIG. 2 specifically shows the configuration of storage area of nonvolatile memory 115 in the embodiment. In FIG. 2, the nonvolatile memory 115 is 1 GB in capacity, and contains eight chips of 1 G bit flash memory. The nonvolatile memory 115 includes a plurality of physical blocks 211. The physical block 211 is an erase block of minimum unit that can be erased selectively, and it has a size of about 4 kB in the embodiment.

The nonvolatile memory 115 is divided into eight address ranges, address ranges 0 to 7, in the vertical direction in FIG. 2, and divided into four banks, banks 0 to 3, in the lateral direction. Each address range includes 4 k blocks of physical blocks 211. Each address range has a user data area 116 for storing data, and an address management table area 117 for storing the address management table 112. In the embodiment, the address management table area 117 provided in each address range stores the address management table 112 corresponding to each address range.

The address management table area 117 stores the address management tables 112 sequentially from the lower position side (upper side in FIG. 2). Further, in order to store a new address management table 112, the unnecessary and old address management tables 112 are erased sequentially. Thus, the address management table area 117 is used recursively. For example, when a write command is sent from the access device 100, and valid data is written in the nonvolatile memory 115, supposing that the latest address management table of address range 1 is written in 2047_a0 to 2047_d0, the address management tables stored in 2046_a1 to 2046_d1 and 2046_a0 to 2046_d0 at the lower position side (upper side in FIG. 2) are erased, and the blocks are invalidated. The areas of invalidated blocks are used later.

The nonvolatile memory 115 also has a current address range number storage area 118 for storing address range specifying information 801 shown in FIG. 8 (detail is described later). In the embodiment, the current address range number storage area 118 is proved at the upper side of the address range 7. The sum of size of user data area 116 of address range 7 and address management table area 117 is set smaller than the size of other address range. While the nonvolatile memory 115 is not used, the current address range number storage area 118 stores the address range specifying information 801 sequentially from the lower position side (upper side in FIG. 2). In order to store a new address range specifying information 801, the unnecessary and old address range specifying information 801 is erased sequentially. Thus, the current address range number storage area 118 is used recursively.

In the nonvolatile memory 115, explanation is omitted about the so-called system area in which security information and manufacturer's code are written.

Figure 3:
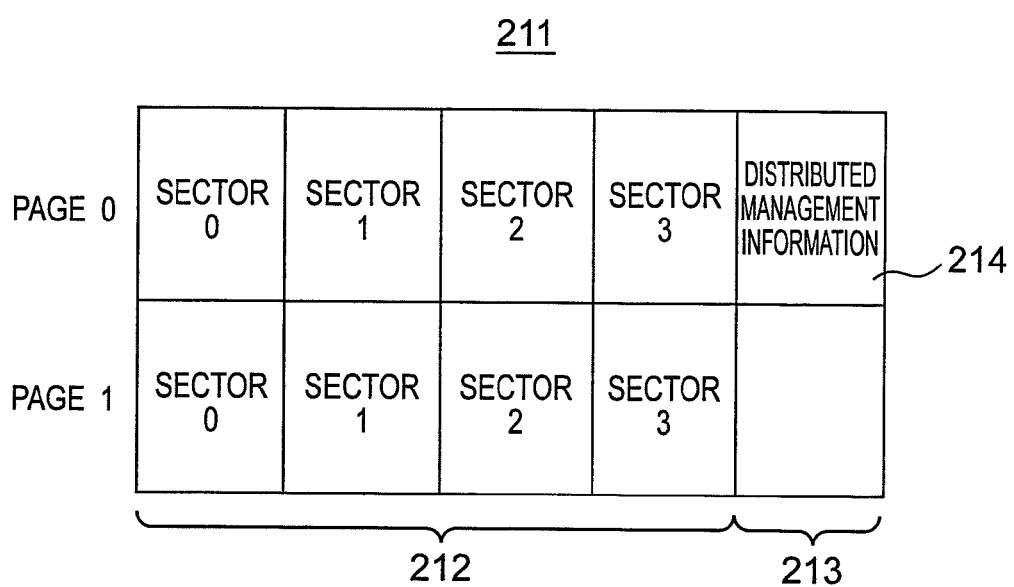
FIG. 3 is a diagram of physical block in first embodiment.

FIG. 3 shows a specific example of physical block 211 in the embodiment. The physical block 211 has two pages, page 0 and page 1. The page is a write unit, and the maximum number of pages to be written simultaneously in FIG. 2 is one page in each of four banks, that is, the maximum is four pages. Each page has a data area 212 of 2048 bytes, and a management area 213 of 64 bytes. One sector is 512 bytes, and the data area 212 includes four sectors. The data area 212 is a region for writing the data transferred from the access device 100. In the management area 213 of page 0, distributed management information 214 is stored. The distributed management information 214 includes a logical block number specified by the access device 100, and a block status showing a status of the physical block 211. When the data transferred from the access device 100 is written into the data area 212 of page 0, the distributed management information 214 is written into the management area 213 of page 0.

[Format of Logical Address]

Figure 4:
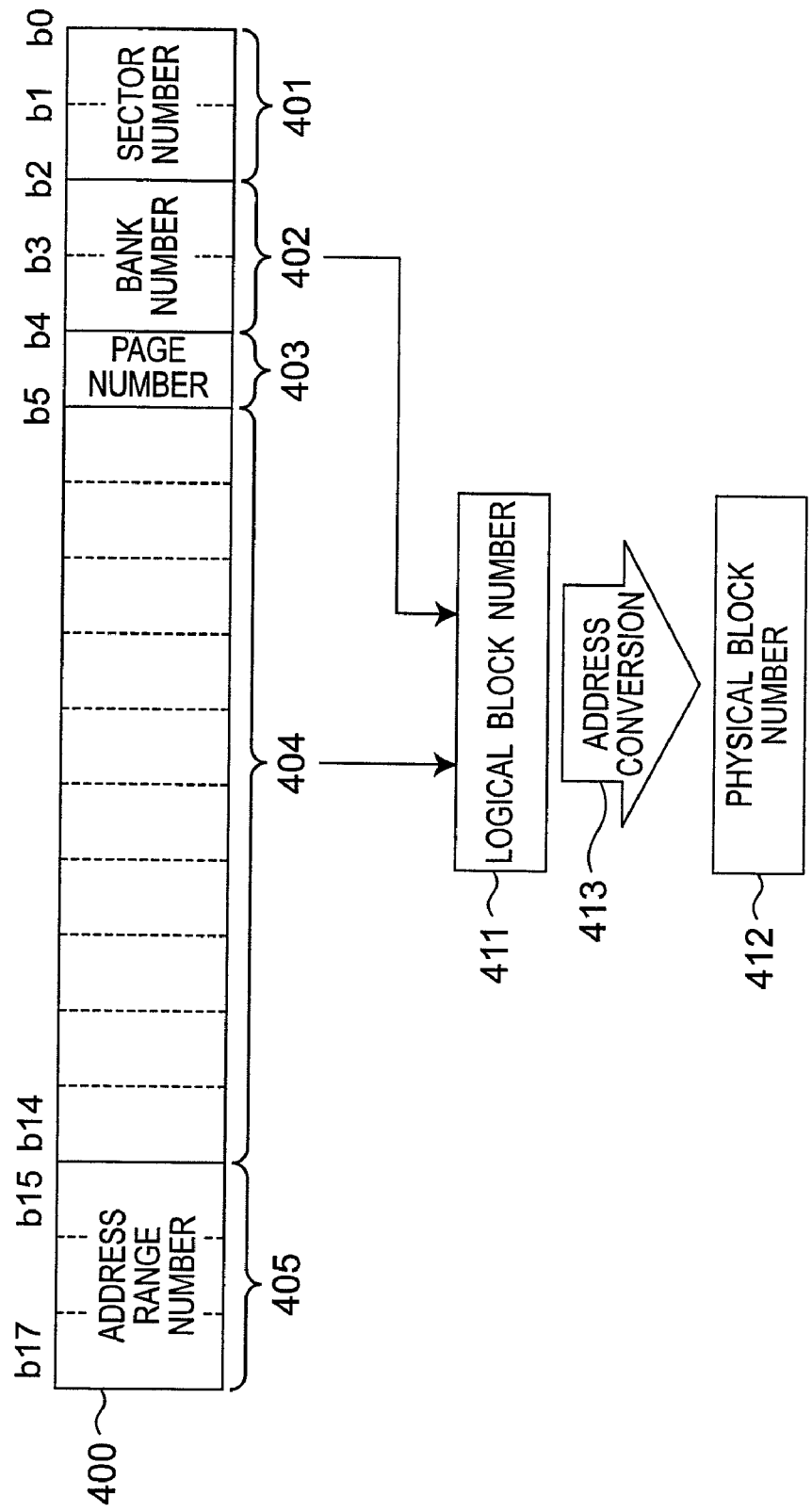
FIG. 4 shows a format of logical address in first embodiment.

FIG. 4 shows the format of logical address 400 to be sent to the nonvolatile storage device 123 from the access device 100 in the embodiment. In the format of logical address 400 in FIG. 4, bit 0 to bit 1 (b0 to b1) relate to sector number 401, bit 2 to bit 3 (b2 to b3) relate to bank number 402, and bit 4 (b4) relates to page number 403. A total of 12 bits including number 404 of bit 5 to bit 14 (b5 to b14) and the bank number 402 correspond to logical block number 411, and bit 15 to bit 17 (b15 to b17) correspond to address range number 405. By address range number 405 of three bits, address ranges 0 to 7 of nonvolatile memory 115 are specified. A total of 12 bits corresponding to logical block number 411 are the object of address conversion to physical block number 412.

[Composition of Address Management Table]

Back to FIG. 1, the address management table 112 includes an address conversion table 110 and a physical area management table 111.

Figure 5:
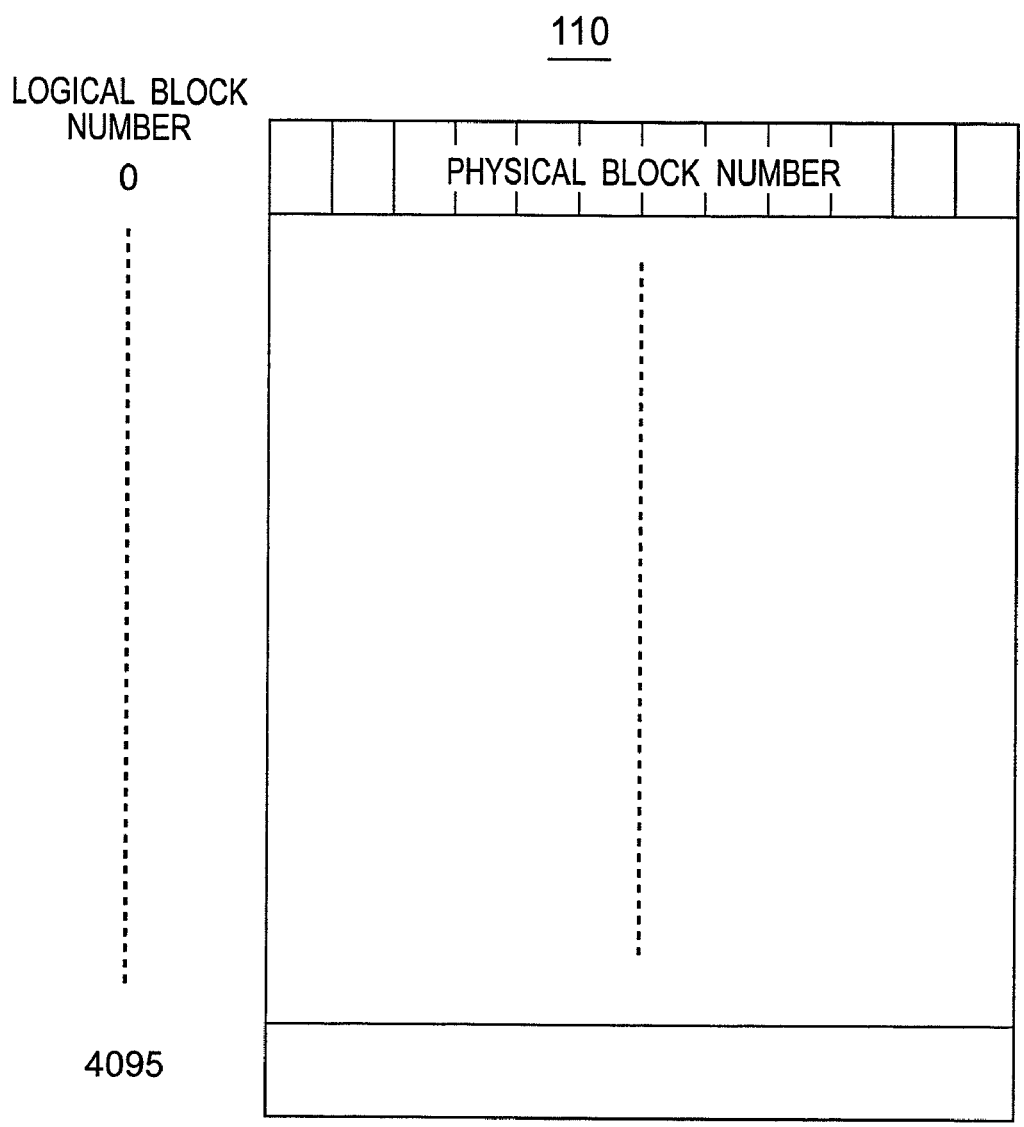
FIG. 5 shows an address conversion table in first embodiment.

FIG. 5 shows the address conversion table 110 in the embodiment. The address conversion table 110 is a table for converting the logical block number 411 included in the logical address 400 specified by the access device 100, into a physical block number 412 in the nonvolatile memory 115. The address conversion table 110 shows a corresponding physical block number 412 for each logical block number 411. In the embodiment, the address conversion table 110 is generated for each address range, and hence includes the physical block numbers 412 specified by 4096 logical block numbers 411.

Figure 6:
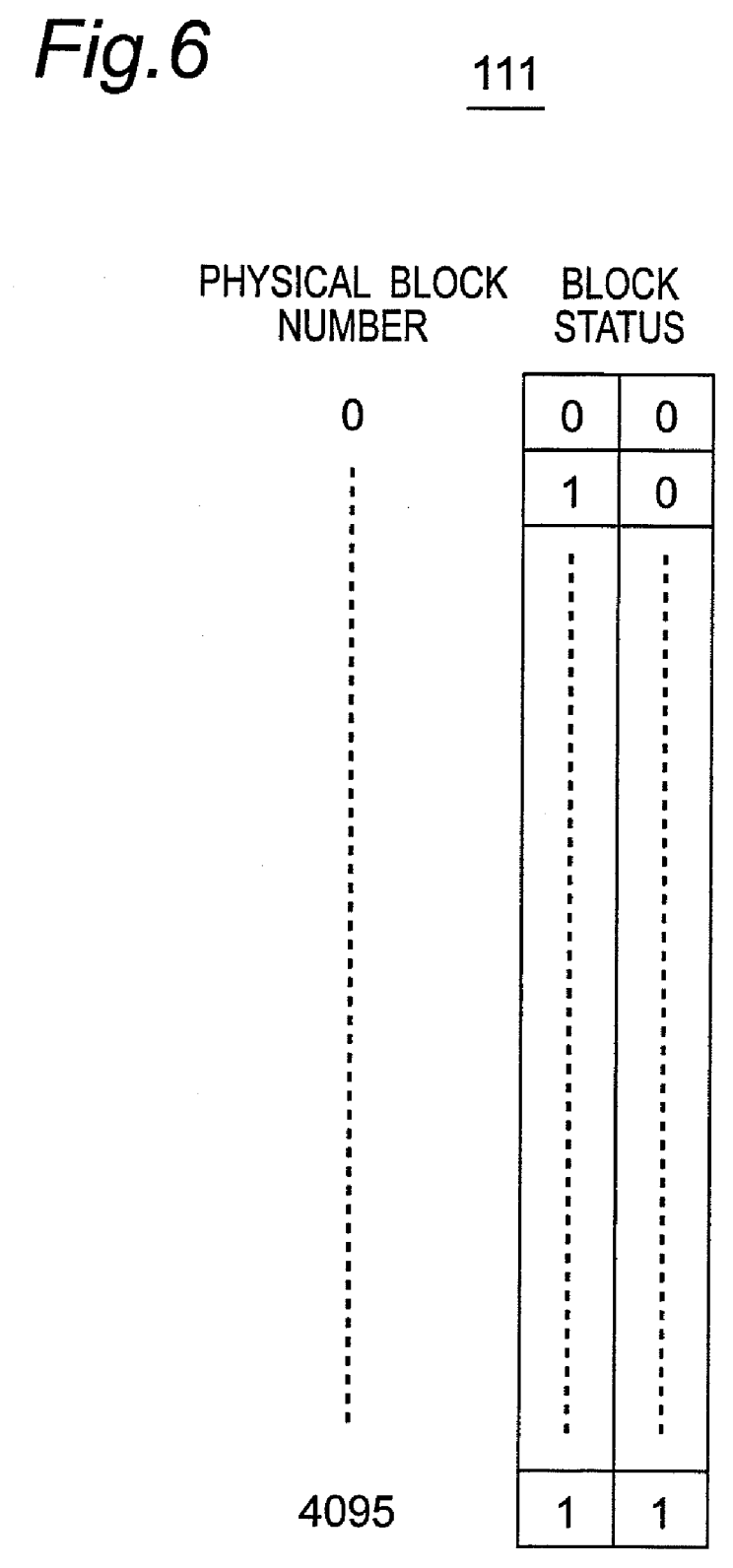

FIG. 6 shows a physical area management table 111 in the embodiment. The physical area management table 111 is a table for storing the state of physical block 211 as erase unit in nonvolatile memory 115, that is, the block status showing whether or not valid data is stored in the physical block 211. The physical area management table 111 shows the state of each physical block in every physical block number 412 of nonvolatile memory 115. The block status showing the state of physical block includes, valid, invalid, defective blocks and the like. Binary number "00" denotes a valid block in which valid data have already been written, and binary number "11" denotes an invalid block in which data have already been erased or written data is not necessary. Binary number "10" denotes a defective block which cannot be used due to solid error on memory cell or the like. Thus, the block status includes at least three states. In the embodiment, the physical area management table 111 is generated for each address range, and block statuses corresponding to 4096 physical block numbers 412 are stored.

[Generation of Address Management Table]

The address management table generation unit 107 shown in FIG. 1 generates the address management table 112 based on the distributed management information 214 stored in the user data area 116 at the time of initialization by the power-on or the like, and stores the address management table 112 in the read-write memory 113. The embodiment is intended to read out only the distributed management information 214 stored in the user data area 116 in the address range being read out from the current address range number storage area 118. That is, the address management table 112 about any one address range in address ranges 0 to 7 is generated at the time of initialization.

The read-write memory 113 is a volatile memory such as SRAM, or a nonvolatile memory such as ferroelectric memory, and temporarily stores the address management table 112. Data writing or the like by instruction from the access device 100 is executed while referring to and updating the address management table 112 stored in the read-write memory 113.

The memory control unit 122 writes the data and distributed management information 214 in the user data area 116 depending on the write instruction from the access device 100. At this time, the address management table control unit 108 in the memory control unit 122 updates the address management table 112 temporarily stored in the read-write memory 113. The address management table control unit 108 writes the address management table 112 temporarily stored in the read-write memory 113 in the address management table area 117 of the present address range through the nonvolatile memory access unit 109, when the write destination address indicated by the access device 100 is changed from the present address range to other address range.

[Writing of Address Range Specifying Information]

The address range specifying information 801 is the information for specifying the address range of switching destination. FIG. 8 shows the address range specifying information 801 in the embodiment. The address range specifying information 801 includes time information 711 identifying the before-after relation of the time, and address range number 712 after changing over at the time of address range changeover time. The lower position side of 27 bits shows the time information 711, and the upper position side of 3 bits shows the address range number 712.

The address range control unit 124 in FIG. 1 includes an address range switching unit 105 and an address range specifying unit 106. The address range specifying unit 106 stores the address range specifying information 801 in the current address range number storage area 118 of the nonvolatile memory 115, by way of the nonvolatile memory access unit 109, when starting writing into changed address range, right after changeover of address range, in order to store which address is the address range being accessed at the present in the nonvolatile memory 115, that is, in order to specify the address range being accessed before supply of power or before resetting, at the time of initialization when turning on the power. In addition, the address range specifying unit 106 reads out the address range specifying information 801 having the latest time information 711 from the current address range number storage area 118 of the nonvolatile memory 115 and specifies the address range number 712 at the time of initialization when turning on the power. Therefore, if the nonvolatile storage device 123 is restarted by an incident such as power failure, the address range specifying unit 106 can specify the address range number 712 previously accessed before restart.

Figure 7:
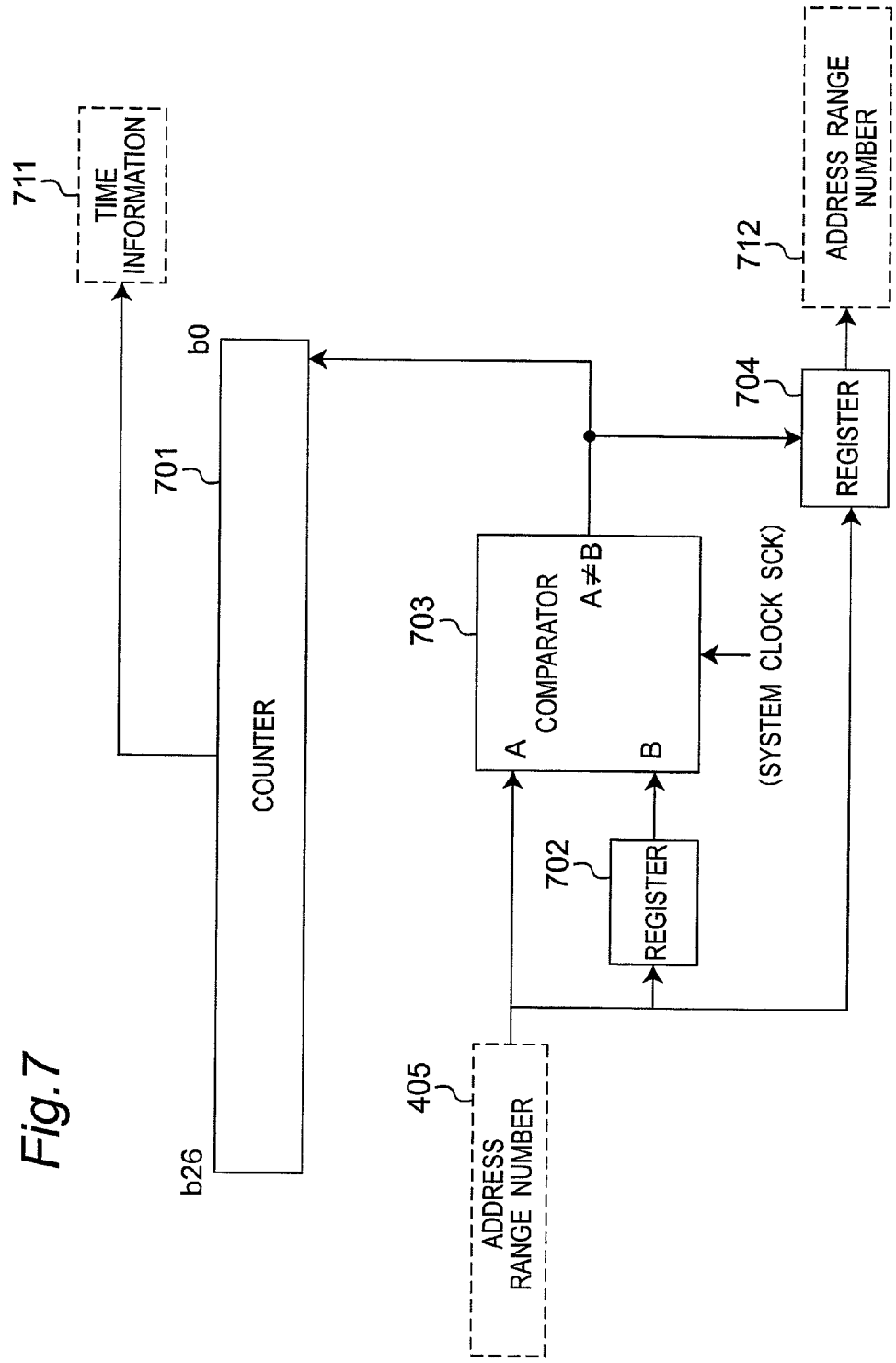
FIG. 7 is a circuit diagram of configuration of address range switching unit in first embodiment.

FIG. 7 shows a configuration of address range switching unit 105 in the embodiment. The address range switching unit 105 includes a counter 701, a register 702, a comparator 703, and a register 704. The register 702 temporarily stores the address range number 405 included in the logical address 400 transferred from the access device 100 depending on the system clock SCK. The comparator 703 compares the address range number 405 transferred from the access device 100 and the address range number 405 temporarily stored in the register 702, and renders the address range changeover signal active and outputs the address range changeover signal when the both are different. When the address range changeover signal is made active, the address range number 405 transferred from the access device 100 is stored temporarily in the register 704. The output of the register 704 is an address range number 712 after changeover when changing over the address range.

When starting, in the counter 701, the time information 711 of the latest address range specifying information 801 stored in the current address range number storage area 118 is preset. Right after shipping from factory, all physical blocks 211 in the nonvolatile memory 115 are erased, and the data of one page in the lowest position in the current address range number storage area 118 is read in, and the time information of initial value 0 is preset in the counter 701. The counter 701 increments by one value when the address range changeover signal becomes active.

The number of bits in the counter 701 of the embodiment is explained. Supposing the average written data capacity by one write command from the access device 100 to be 16 kB of four physical blocks (that is, one cluster in FAT16), in the user data area 116 of one address range, the number of commands for writing all physical blocks is about 1 k times (the tenth power of 2) from formula (1).

$$(4 \text{ k blocks} \times 4 \text{ kB})/16 \text{ kB} = 1 \text{ k} \quad (1)$$

Supposing the rewriting life of nonvolatile memory 115, that is, the number of times of rewriting lower than the guaranteed conforming block rate to be 100,000 times (about the 17th power of 2), the number of bits of the counter 701 in the embodiment is 27 bits from formula (2).

$$17+10=27 \quad (2)$$

The number of bits may be increased in consideration of difference in rewriting life of nonvolatile memory 115, or a design allowance.

The address range switching unit 105 having such configuration detects whether or not the address range number 405 is changed based on the logical address 400 transferred from the access device 100, and when detecting the changeover, the address range number 712 of changeover destination is output, and the time information 711 showing before-after relation of time is output so as to clarify when the transfer command of access device 100 is given.

[Initialization Process]

In the nonvolatile storage system having such configuration, initialization process of nonvolatile storage device 123 is explained. When the power source of nonvolatile storage device 123 is turned on by the access device 100, the CPU 102 performs initializing process according to the program stored in the ROM 104. Aside from the time of turning on the power source, the initialization is also executed when resetting the nonvolatile storage device 123.

In initialization process, the address range specifying unit 106 searches the current address range number storage area 118 of the nonvolatile memory 115 through the nonvolatile memory access unit 109, and reads out the largest value of time information 711 of the address range specifying information 801 stored in the current address range number storage area 118 as the latest address range specifying information 801. As a result, the address range number 712 which is accessed before turning on the power source is identified. The time information 711 included in the address range specifying information 801 is preset in the counter 701. When all bit values in the time information 711 are 1, it is judged that the system is fresh from factory, and the value of 0 is preset in the counter 701.

The address management table generation unit 107 reads out distributed management information 214 stored in the user data area 116 in the specified address range, generates address conversion table 110 and physical area management table 111, and stores the tables 110 and 111 in the read-write memory 113. After the initialization process, the nonvolatile storage device 123 is ready to receive read or write command from the access device 100.

[Data Writing Process in Address Range]

When the memory controller 114 receives a logical address 400 for instructing writing into an arbitrary address range from the access device 100, for example, instructing address range number 405 of "0", the address range switching unit 105 judges if the address range number 405 transferred from the access device 100 is same as the address range number 712 specified at the time of initialization or not. If same, based on the address management table 112, the logical block number 411 included in the logical address 400 is converted into physical block number 412, and data is written into the physical block 211 specified by the physical block number 412.

Figure 9:
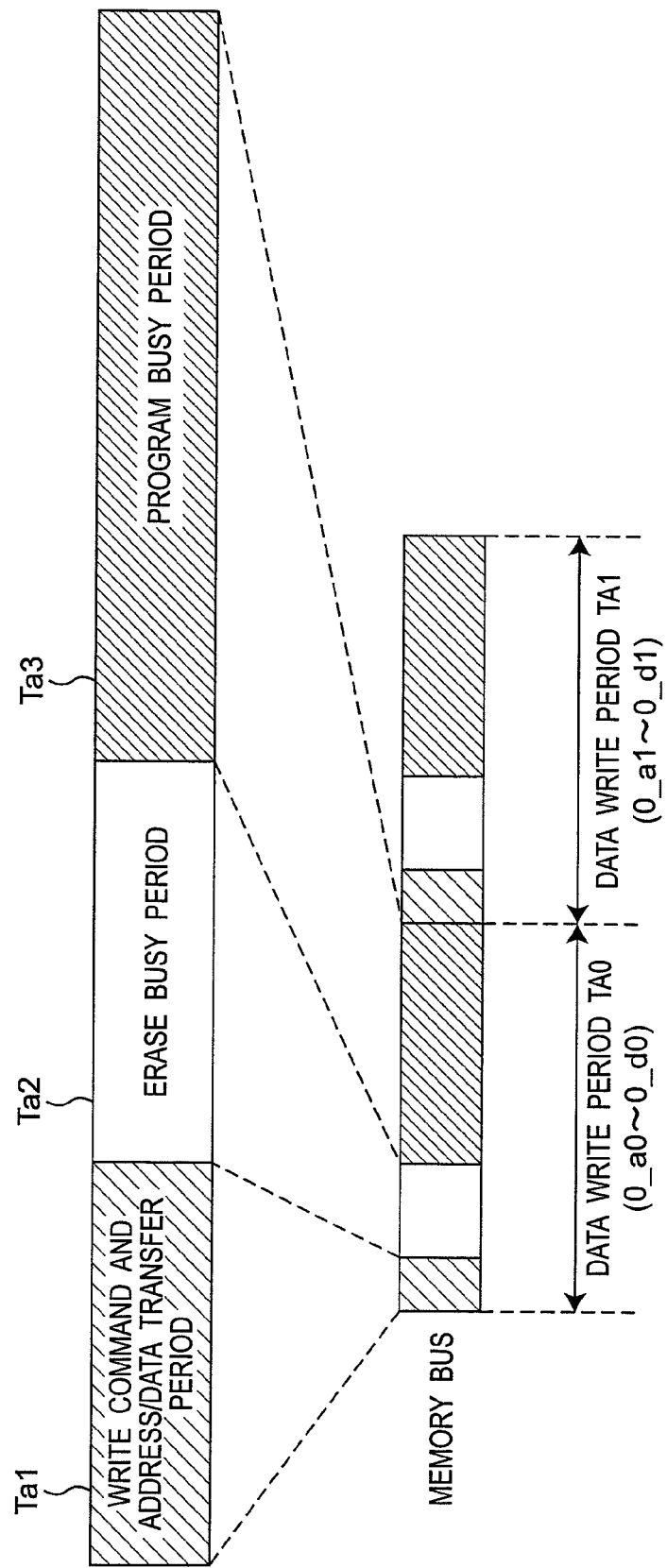
FIG. 9 is a diagram showing a write sequence when address range is not changed in first embodiment.

FIG. 9 shows an ordinary writing sequence when the address range is not changed over in the embodiment. FIG. 9 shows data write period TA0 for writing data in page 0 of the physical block 211, and data write period TA1 for writing data in page 1 of the physical block 211. In the embodiment, data is written into the nonvolatile memory 115 by multibank write for writing simultaneously page 0 or page 1 in the portion of 4 pages in banks 0 to 3. The data write period TA0 and TA1 include write command and address/data transfer period Ta1, erase busy period Ta2, and program busy period Ta3.

In data write period TA0, the memory controller 114 first transfers the write command, the physical block number 412 in the user data area 116, and data of 4 pages of banks 0 to 3 to the nonvolatile memory 115 (write command and address/data transfer period Ta1). At this time, distributed management information 214 is also transferred to nonvolatile memory 115. Next, the physical block 211 specified by the physical block number 412 is erased (erase busy period Ta2). Finally, data and distributed management information 214 are written in page 0 of the physical block 211 in banks 0 to 3, and the address management table 112 on the read-write memory 113 is updated (program busy period Ta3).

Next, in data write period TA1, same process as in data write period TA0 is done, and data is written in page 1 of the physical block 211 in the portion of 4 pages in banks 0 to 3. However, distributed management information 214 is not written in page 1.

In first period of the data write period TA0 and TA1 in FIG. 9, for example, data is written in physical blocks 211 of logical address 0_a0 to 0_d0 and 0_a1 to 0_d1. If operation of data write period TA0 and TA1 is repeated in address range 0, data is written, for example, in physical blocks 211 of logical address from "0_a0 to 0_d0" to "1021_a1 to 1021_d1".

In the access device 100 using FAT16, usually, one cluster is 16 kB, and in many products, the access device 100 transfers the write instruction to the nonvolatile storage device 123 by the unit of 16 kB. In the conventional semiconductor memory device shown in patent document 1, after writing the portion of 16 kB, the address management table 112 temporarily stored in the read-write memory 113 is written back in the nonvolatile memory 115, and the overhead in time has caused to decline the processing speed. In the nonvolatile storage device 123 of the embodiment, however, when the address range is not changed over, the address management table 112 temporarily stored in the read-write memory 113 is not written back in the nonvolatile memory 115, and the distributed management information 214 is written in simultaneously with writing of data, and the overhead is rationalized.

[Data Writing Process when Address Range is Changed]

Figure 10:
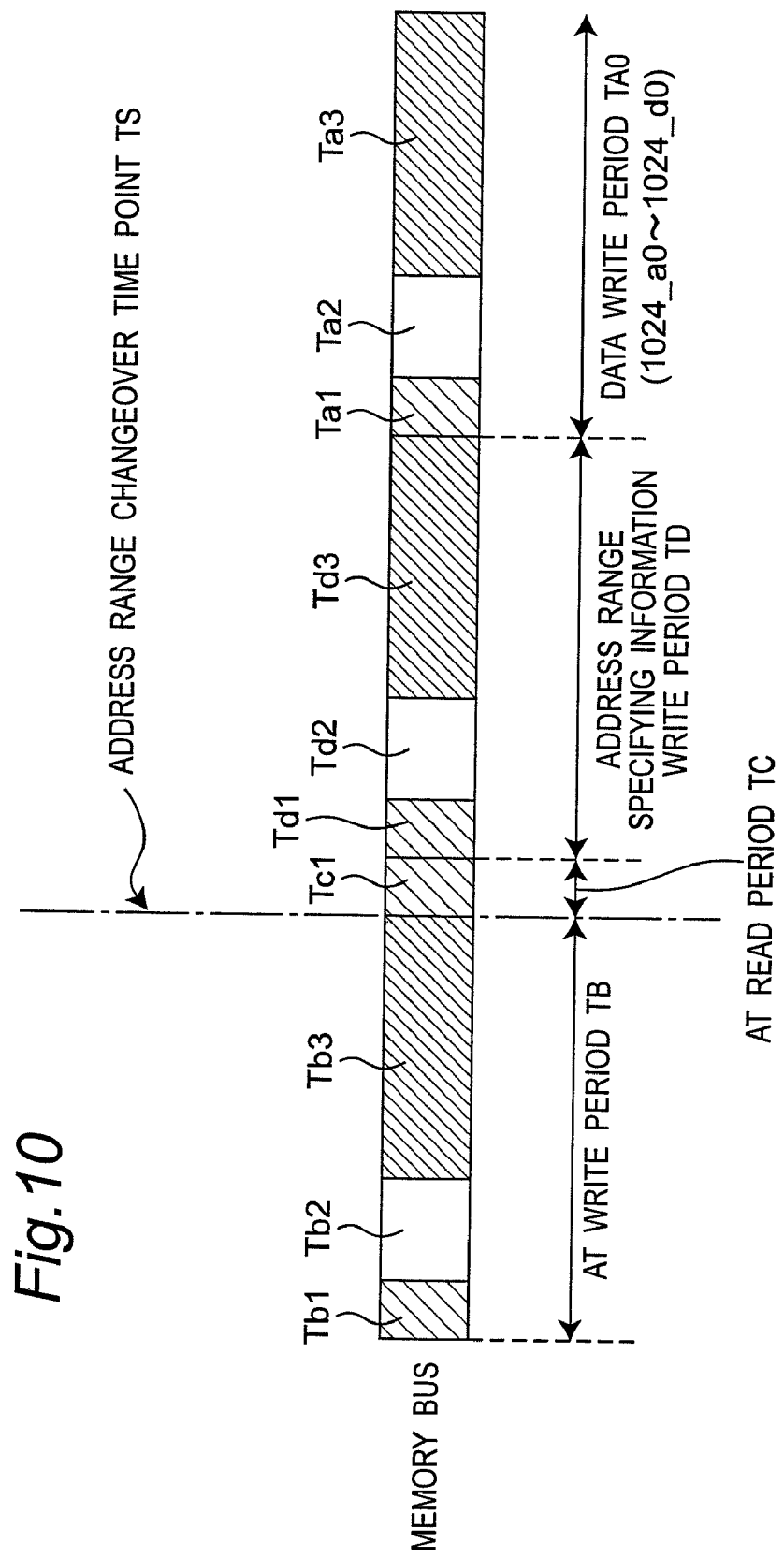
FIG. 10 is a diagram showing a write sequence when address range is changed in first embodiment.

The operation of nonvolatile storage device 123 when the address range number transferred from the access device 100 is changed over is explained. FIG. 10 shows the writing sequence when the address range is changed over. When the address range switching unit 105 detects that the address range is changed over by means of the comparator 703, the memory control unit 123 processes in the sequence of address management table write period ("AT write period") TB, address management table read period ("AT read period") TC, and address range specifying information write period TD. An example is explained below by supposing that the address range specified by the access device 100 is changed from 0 to 1.

After data is written in physical blocks 211 of logical address 1021_a1 to 1021_d1 in address range 0, the memory controller 114 receives logical address 400 specifying address range 1 from the access device 100, and the address range switching unit 105 detects that the address range is changed from 0 to 1 by means of the comparator 703. As a result, the memory controller 114 first processes in AT write period TB, as post-process of former address range.

In AT write period TB, the memory controller 114 writes back the address management table 112 of address range 0 temporarily stored in the read-write memory 113 as the latest address management table, in the address management table area 117 of address range 0 of nonvolatile memory 115. First, the memory controller 114 transfers the write command, physical block number 412 in address management table area 117 in address range 0, and address management table 112 stored in the read-write memory 113 to the nonvolatile memory 115 (write command and address/AT transfer period Tb1). Next, the physical block 211 specified by the physical block number 412 is erased (erase busy period Tb2). Finally, in the place of erased physical block 211, address management table 112 is written (program busy period Tb3).

This ends the writing process in address range 0, and between end point of AT write period TB and start point of AT read period, an actual address range changeover time point TS exists. As pre-process of new address range, processing is done in AT read period TC and address range specifying information write period TD.

In AT read period TC, the CPU 102 issues a read instruction of address management table 112 of address range 1 to the nonvolatile memory access unit 109, and the nonvolatile memory access unit 109 reads out the address management table 112 of address range 1 from the address management table area 117 of address range 1, and the address management table control unit 108 stores the obtained address management table 112 in the read-write memory 113 (read command and address/AT transfer period Tc1). The address management table 112 being read herein is the latest address management table in the address management table area 117 in address range 1. It is judged as follows whether the address management table 112 is the latest or not. First, the highest position address of page of physical block in the address management table area 117, specifically, the portion of 4 pages of logical address 2047_a1 to 2047_d1 in FIG. 2 (a total of 8 kB) is judged to be erased or not as a set. If not erased, the set of logical address 2047_a1 to 2047_d1 is judged to be the latest address management table. If erased, the upper position direction in FIG. 2, that is, the lower position side of nonvolatile memory 115 is searched, and a portion not erased, that is, a portion of 4 pages in which certain value is written is selected as the latest address management table.

Right after shipping of nonvolatile storage device 123, all physical blocks in the nonvolatile memory 115 are erased. Actually, a specified value is written in the system region, but this state is omitted in the explanation of the embodiment. In this case, four pages in the lowest position (upper side in FIG. 2), that is, 2046_a0 to 2046_d0 are written into the read-write memory 113 as address management table 112. At this time, the physical area management table 111 in FIG. 6 shows all invalid blocks "11", and valid data is not stored in address range 1.

Figure 8:
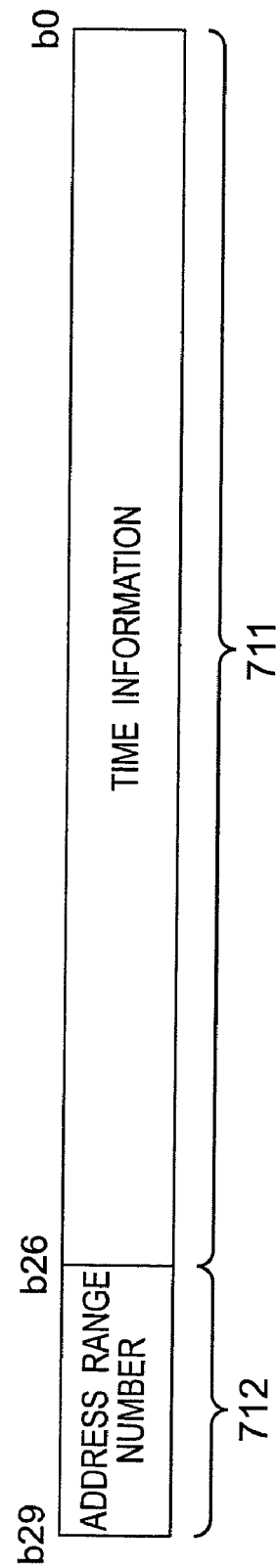
FIG. 8 shows address range specifying information in first embodiment.

In the address range specifying information write period TD, the memory controller 114 stores the address range specifying information 801 including address range number 712 after changeover shown in FIG. 8 in the current address range number storage area 118 of nonvolatile memory 115. First, the counter 701 in the address range specifying unit 106 increments, and the address range number 712 after changeover is stored in the register 704. The address range specifying unit 106 generates address range specifying information 801 including time information 711 of counter 701 and address range number 712 stored in the register 704. The nonvolatile memory access unit 109 transfers the write command, physical block number 412 in the current address range number storage area 118 of nonvolatile storage device 115, and address range specifying information 801 to the nonvolatile memory 115 (write command and address/address range specifying information transfer period Td1). Next, the physical block 211 specified by physical block number 412 is erased (erase busy period Td2). Finally, in the place of erased physical block 211, address range specifying information 801 is written (program busy period Td3).

In the data write period TA0 after address range specifying information write period TD, data is written in logical address 1024_a0 to 1024_d0 in address range 1.

In the address range specifying information write period TD, the address range specifying information 801 is stored in the current address range number storage area 118 of the nonvolatile memory 115, and therefore, when starting next time, the address range number 712 which is accessed before start can be identified. Hence, when starting up after power failure or other trouble, the address range specifying unit 106 can identify that power failure or other trouble has occurred in which address range. If the address management table 112 is not written back in the address management table area 117 in the address range of which process has been interrupted, the address conversion table 112 about the address range stored in the address range specifying information 801 is generated by using the distributed management information 214 at the time of initialization, and hence old address conversion table 112 is not used by mistake.

[Time Required for Initialization Process]

In this embodiment, the distributed management information 214 to be read in by the address management table generation unit 107 by way of the nonvolatile memory access unit 109 is limited to one address range only. For example, if the nonvolatile memory 115 has multibank page read function, supposing the required time in each multibank page read to be 100 usec, reading of distributed management information 214 is completed in about 100 msec according to formula (3).

$$100\ \text{usec} \times 1\ \text{k} = 100\ \text{msec} \tag{3}$$

In the case of semiconductor memory device having a capacity of 1 GB (made of 8 flash memory chips), it is about 800 msec according to formula (4).

$$100\ \text{msec} \times 8\ \text{pieces} = 800\ \text{msec} \tag{4}$$

By contrast, the conventional semiconductor memory device shown in patent document 2 reads out the distributed management information in all regions, and hence the reading time is about 6400 msec according to formula (5).

$$800\ \text{msec} \times 8 = 6400\ \text{msec} \tag{5}$$

Since the nonvolatile memory 115 in patent document 2 is not divided into 8 sections, the value in formula (5) is 8 times more than in formula (4). This value is too long for the user as waiting time for starting. The value in formula (5) is larger as the capacity of the nonvolatile memory is increased, and it is a fatal problem.

The required time for initialization process in the embodiment is ⅛ of that of document 2, and processing is finished in a short time.

[Date Rewriting Rate]

Increase of writing speed in the embodiment is explained quantitatively below. The data write period TA0 and TA1 shown in FIG. 9, and the AT write period TB and data write period TA0 shown in FIG. 10 are supposed to be 1.5 msec individually.

Suppose the conventional semiconductor memory device of patent document 1 writes data, for example, in the 4 physical blocks of logical address 0_a0 to 0_d0 and 0_a1 to 0_d1, since the AT write period TB was needed after data write period TA1 in FIG. 9, it required 4.5 msec according to formula (6).

$$1.5\ \text{msec} \times 3 = 4.5\ \text{msec} \tag{6}$$

On the other hand, in the embodiment, when the address range is not changed, when writing data, for example, in 4 physical blocks of logical address 0_a0 to 0_d0 and logical address 0_a1 to 0_d1, it takes 3 msec according to formula (7).

$$1.5\ \text{msec} \times 2 = 3\ \text{msec} \tag{7}$$

Thus, when the address range is not changed, the writing time in the embodiment is shorter than the writing time shown in patent document 1.

When the address range is changed, the embodiment requires, as shown in FIG. 10, AT write period TB for post-process of former address range, AT read period TC and address range specifying information write period TD for pre-process of new address range, and the required time is longer than that in patent document 1.

In consideration of this background, the embodiment and patent document 1 are compared based on the rate value for rewriting all of one logical range by the unit of 16 kB. First, the capacity of one address range is about 16 MB (for the sake of simplicity, the address management table area portion is supposed to be an error), and the access device 100 instructs writing of 1 k times for rewriting one address range by 16 kB unit according to formula (8).

$$16\ \text{MB}/16\ \text{kB} = 1\ \text{k times} \tag{8}$$

In this case, in the conventional semiconductor memory device shown in patent document 1, the rewriting rate is 3.6 MB/sec in average according to formula (9).

$$16\ \text{MB}/(1\ \text{k times} \times 4.5\ \text{msec}) = \text{approx. } 3.6\ \text{MB/sec} \tag{9}$$

On the other hand, in the nonvolatile storage device 123 in the embodiment, the rewriting rate is 5.5 MB/sec in average as shown in formula (10), and the nonvolatile storage device 123 in the embodiment can rewrite one address range at higher speed.

$$16\ \text{MB}/\{(1\ \text{k times} \times 3\ \text{msec}) + (2\ \text{times} \times 1.5\ \text{msec})\} = \text{approx. } 5.5\ \text{MB/sec} \tag{10}$$

Momentary speed deterioration when changing over the address range is in the several milliseconds order, and it can be absorbed sufficiently by using the buffer generally provided at the access device 100 side. Hence, the processing is not disturbed.

Thus, according to the embodiment, if the memory capacity of the nonvolatile memory 115 increases, the initialization time when starting can be minimized, and the overhead of time when updating the address management table 112 can be rationalized, and hence the rewriting rate is improved. In the invention, therefore, the creation time of address management table 112 in initialization process after power failure or other trouble can be shortened, while avoiding drop of access speed due to writing back process of address management table 112 in ordinary operation.

The management area 213 in FIG. 3 may store time information 711 in addition to distributed management information 214. For example, when writing data into data area 212 of user data area 116, the time information 711 is written into management area 213. At the time of initialization process, after specifying the address range, by reading out only the physical block 211 in which the time information 711 coinciding with the time information 711 of address range specifying information 801 is written, the latest address management table 112 stored in the address management table area 117 may be revised. As a result, the address management table 112 in the address management table area 117 can be updated in a short time, and it is useful for initialization process after interruption of process due to power failure or other trouble.

The read-write memory 113 is not limited to RAM, and may also include other read-write memory as far as accessible at relatively high speed. The nonvolatile memory 115 may incorporate a plurality of nonvolatile memory chips. The nonvolatile memory 115 may be also other nonvolatile memory than flash memory.

The nonvolatile memory 115 may be realized by one flash memory chip, or a plurality of flash memory chips.

In the embodiment, the address management table area 117 is provided in each address range, but address management tables 117 of address ranges 0 to 7 may be collected and provided, for example, in the final region of the nonvolatile memory 115.

The storing position of address management table 112 may not be fixed physically as in the address management table area 117 in the embodiment. For example, address management table area 117 is not provided, but the address management table 112 is stored in the physical blocks 211 of user data area 116. At this time, the pointer information for indicating the physical address of storing destination of the address management table 112 is stored in the nonvolatile memory 115, and the storing position can be searched depending on the pointer information.

The position of current address range number storing region 118 is not limited to the upper position side of address range 7. In the embodiment, the address range specifying information 801 is stored in the current address range number storage area 118 of the nonvolatile memory 115, but it may be stored in other nonvolatile memory disposed aside from nonvolatile memory 115.

The address range specifying information 801 may be written back to the nonvolatile memory 115 in a form being assembled in the address management table 112 corresponding to the range before changeover when the address range is changed over. In this case, in initialization after turning on the power, the latest address management table 112 stored in all address ranges 0 to 7 is investigated, and the address range number 712 stored in the address management table 112 including the most immediate time information 711 is judged to be the address range number at the time of power failure.

Second Embodiment

Figure 11:
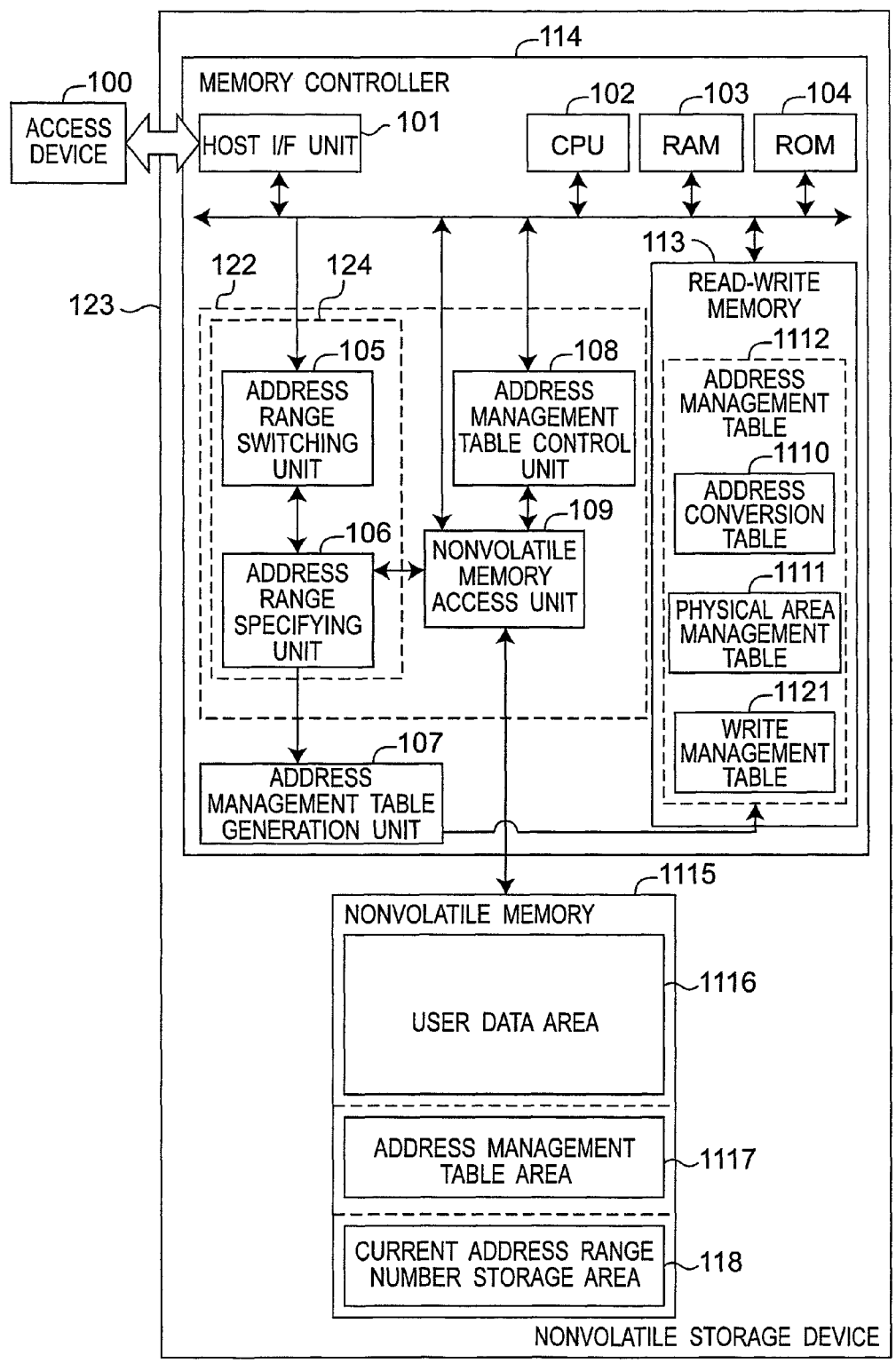
FIG. 11 is a block diagram of nonvolatile storage system in second embodiment of the invention.

FIG. 11 is a block diagram of nonvolatile storage system in the second embodiment of the invention. The nonvolatile storage system in the embodiment is similar to the first embodiment, except for the size of address range of nonvolatile memory 1115, and the generating method of address management table 1112 at the time of initialization.

The nonvolatile storage system of the embodiment includes an access device 100 and a nonvolatile storage device 123 operating based on the read or write command of data sent from the access device 100.

The nonvolatile storage device 123 includes a nonvolatile memory 1115 that stores the data transferred from the access device 100, and a memory controller 114 that controls the nonvolatile memory 1115 based on the read or write command and logical address sent from the access device 100. The storage area of the nonvolatile memory 1115 includes a plurality of address ranges.

[Internal Configuration of Memory Controller]

The memory controller 114 includes a host I/F unit 101, a work RAM 103, a ROM 104 storing a program, and a CPU 102 for controlling the entire memory controller 114 by using the work RAM 103 and the program stored in the ROM 104.

The memory controller 114 further includes a memory control unit 122 for controlling the nonvolatile memory 1115, an address management table generation unit 107 for generating an address management table 1112, and a read-write memory 113 for temporarily storing the address management table 1112.

The memory control unit 122 has an address range control unit 124 for judging changeover of address range of the nonvolatile memory 1115, a nonvolatile memory access unit 109 for controlling reading or writing of data in the nonvolatile memory 1115, and an address management table control unit 108 for writing the address management table 1112 temporarily stored in the read-write memory 113, into the nonvolatile memory 1115 by way of the nonvolatile memory access unit 109.

[Internal Configuration of Nonvolatile Memory]

Figure 18:
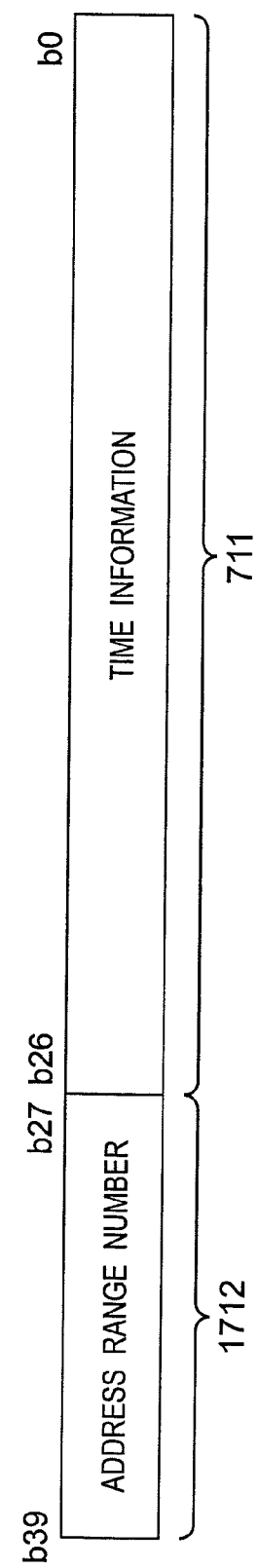
FIG. 18 shows address range specifying information in second embodiment.

In the embodiment, the storage area of the nonvolatile memory 1115 includes a user data area 1116 for storing data, an address management table area 1117 for storing the address management table 1112, and a current address range number storage area 118 for storing the address range specifying information 1801 shown in FIG. 18.

Figure 12:
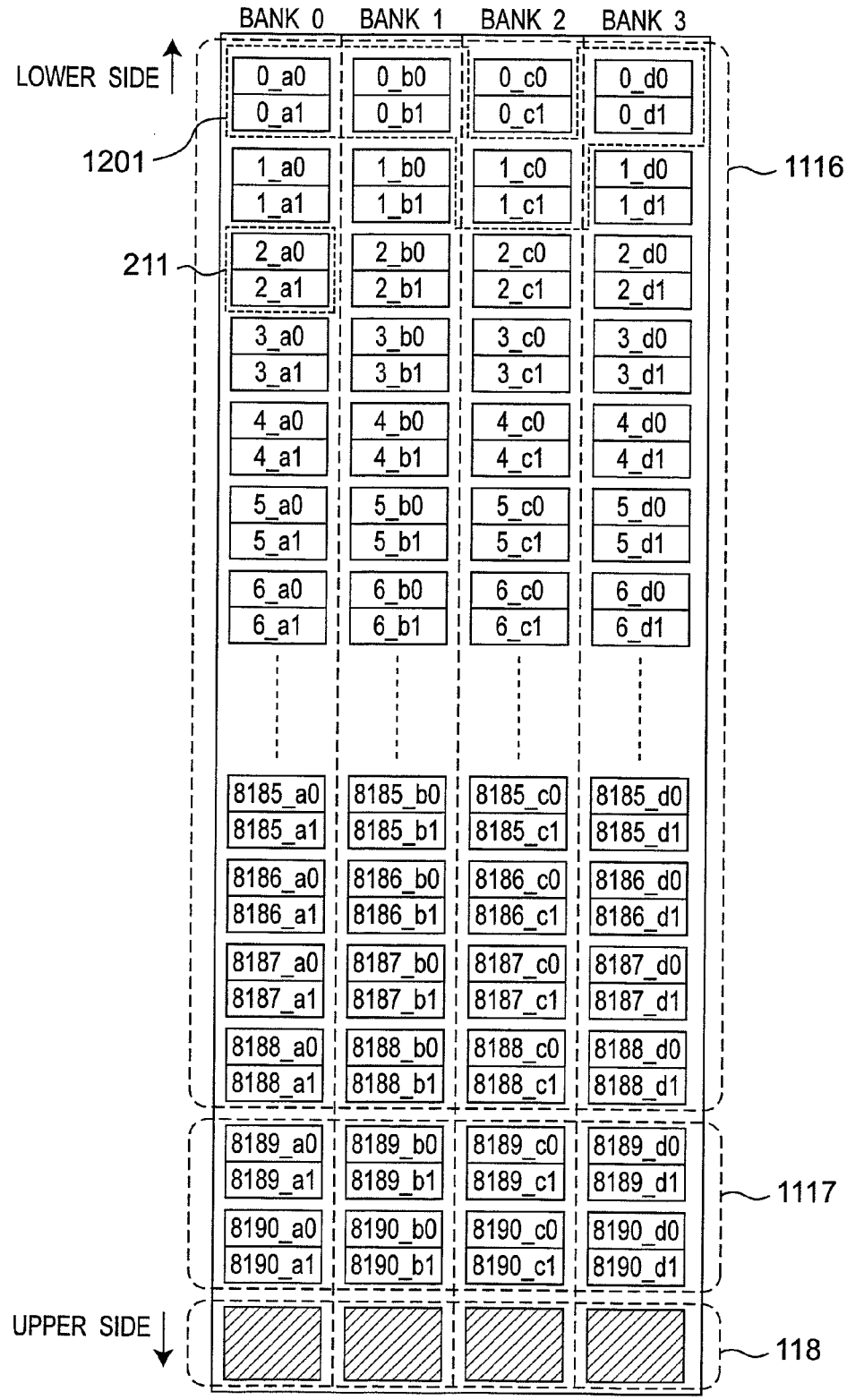
FIG. 12 is an internal configurational diagram of nonvolatile memory in second embodiment.

FIG. 12 specifically shows the configuration of storage area of nonvolatile memory 1115 in the embodiment. In FIG. 12, the nonvolatile memory 1115 is 1 GB in capacity, and includes eight chips of 1 G bit flash memory. The nonvolatile memory 1115 includes a plurality of physical blocks 211. The physical block 211 is an erase block of minimum unit that can be erased selectively, and it has a size of about 4 kB in the embodiment.

The nonvolatile memory 1115 is divided into four banks, banks 0 to 3, in the lateral direction. The address range 1201 in the embodiment includes a total of four physical blocks 211 selected from each bank in the user data area 1116. For example, four physical blocks of logical block number "0" including logical address 0_a0 and 0_a1 to 0_d0 and 0_d1 constitute one address range 1201. That is, in the embodiment, the logical block number is an address range number for specifying the address range 1201, and, for example, logical block number "0" is address range number "0". In FIG. 12, the user data area 1116 has an address range of 0 to 8188.

In the embodiment, the address management table area 1117 is not provided in the address range 1201, but is provided in the region of upper position side of the nonvolatile memory 1115. The address management table area 1117 stores the address management tables 1112 sequentially from the lower position side (upper side in FIG. 12). Further, in order to store a new address management table 1112, the old and unnecessary address management tables 1112 are erased sequentially. Thus, the address management table area 1117 is used recursively. For example, when a write command is sent from the access device 100, and valid data is written in the nonvolatile memory 1115, supposing that the latest address management table 1112 is stored in the logical address 8190_a0 to 8190_d0, the address management tables 1112 stored in 8189_a1 to 8189_d1 and 8189_a0 to 8189_d0 at the lower position side (upper side in FIG. 12) are erased as invalid blocks. The erased regions can be used later.

The storage area of nonvolatile memory 1115 has a current address range number storage area 118 at the upper position side of address management table area 1117. The current address range number storage area 118 is a region for storing the information for specifying the address range number, and stores the address range specifying information 1801 shown in FIG. 18. By having the current address range number storage area 118, the address range number which is accessed before restart can be identified when restarting operation after power failure or other trouble. The current address range number storage area 118 is used recursively while erasing the physical blocks 211 storing old and unnecessary address range specifying information 1801.

In the nonvolatile memory 1115, explanation is omitted about the so-called system region in which security information and manufacturer's code are written.

Figure 13:
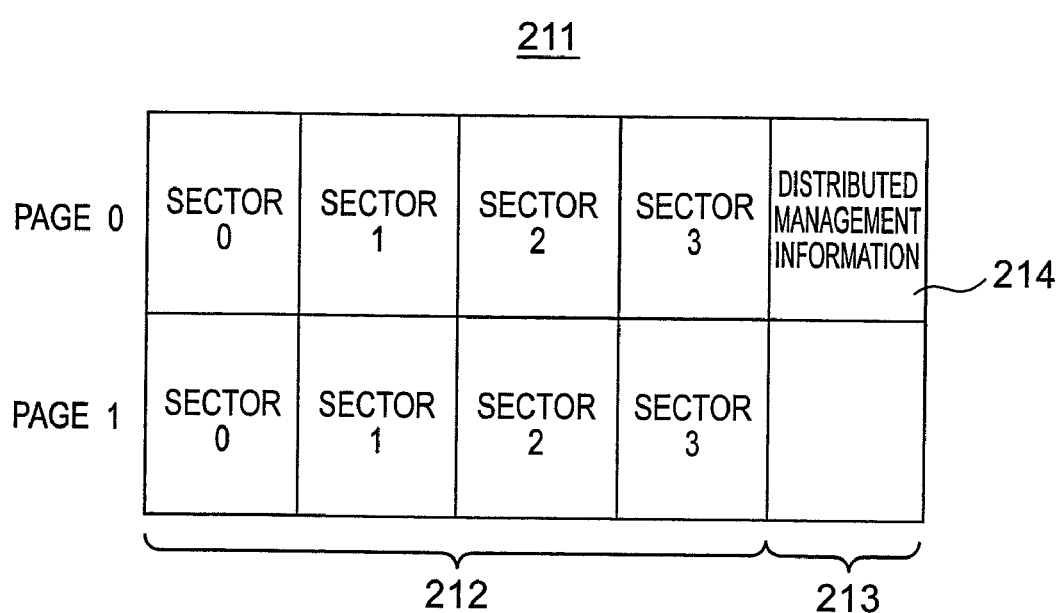
FIG. 13 is a diagram of physical block in second embodiment.

FIG. 13 shows a specific example of physical block 211 in the embodiment. The physical block 211 has two pages, page 0 and page 1. The page is a write unit, and the maximum number of pages to be written simultaneously in FIG. 12 is one page in each of four banks, that is, the maximum is four pages. Each page has a data area 212 of 2048 bytes, and a management area 213 of 64 bytes. One sector is 512 bytes, and the data area 212 includes four sectors. The data area 212 is a region for writing the data transferred from the access device 100. In the management area 213 of page 0, distributed management information 214 is stored. The distributed management information 214 includes the logical block number specified by the access device 100, and the block status showing the status of the physical block 211. When the data transferred from the access device 100 is written into the data area 212 of page 0, the distributed management information 214 is written into the management area 213 of page 0.

[Format of Logical Address]

Figure 14:
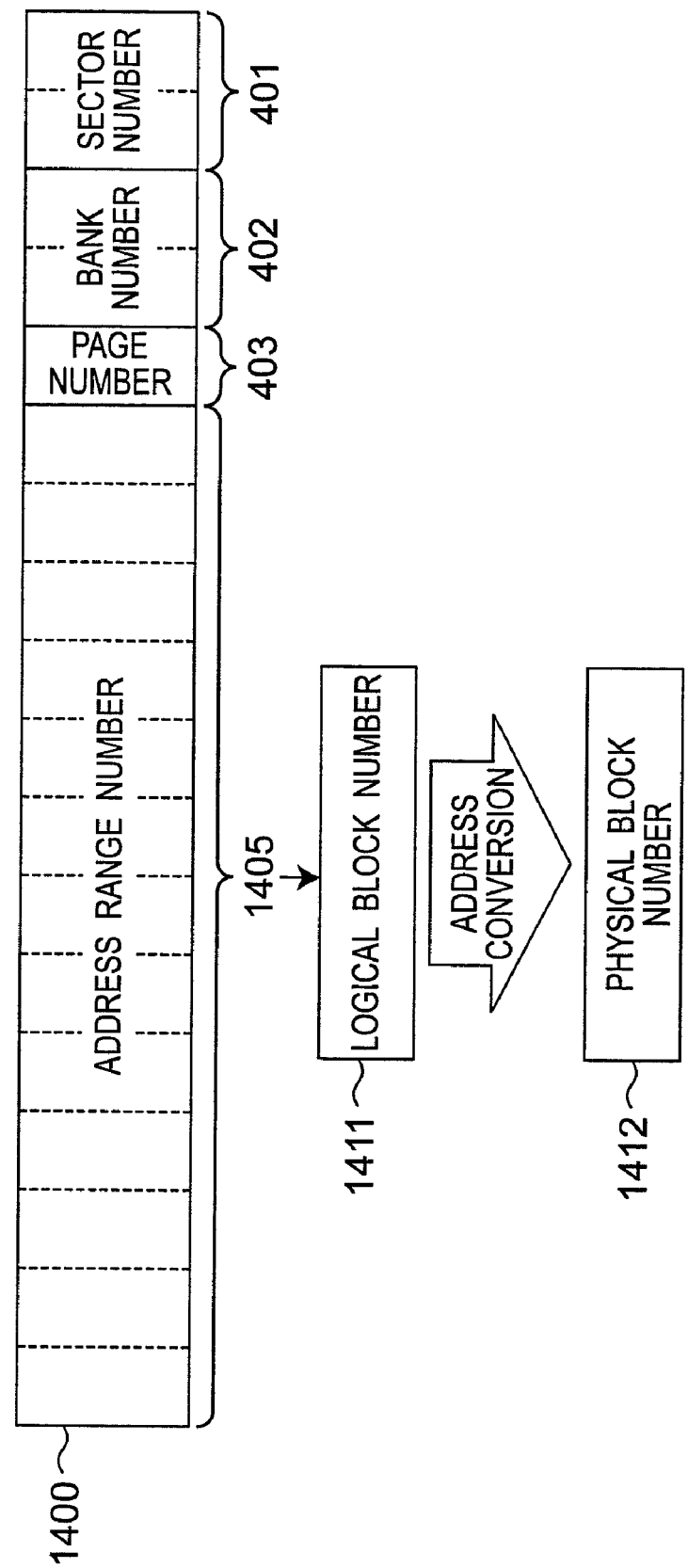
FIG. 14 shows a format of logical address in second embodiment.

FIG. 14 shows the format of logical address 1400 which the access device 100 sends to the nonvolatile storage device 123 in the embodiment. The logical address 1400 includes, sequentially from the lower position bit, a sector number 401, a bank number 402, a page number 403, and an address range number 1405. In the embodiment, the address range number 1405 is a logical block number 1411. A portion of 13 bits corresponding to logical block number 1411 is the object of address conversion to physical block number 1412.

[Composition of Address Management Table]

As shown in FIG. 11, the address management table 1112 of the embodiment includes an address conversion table 1110, a physical area management table 1111, and a write management table 1121.

Figure 15:
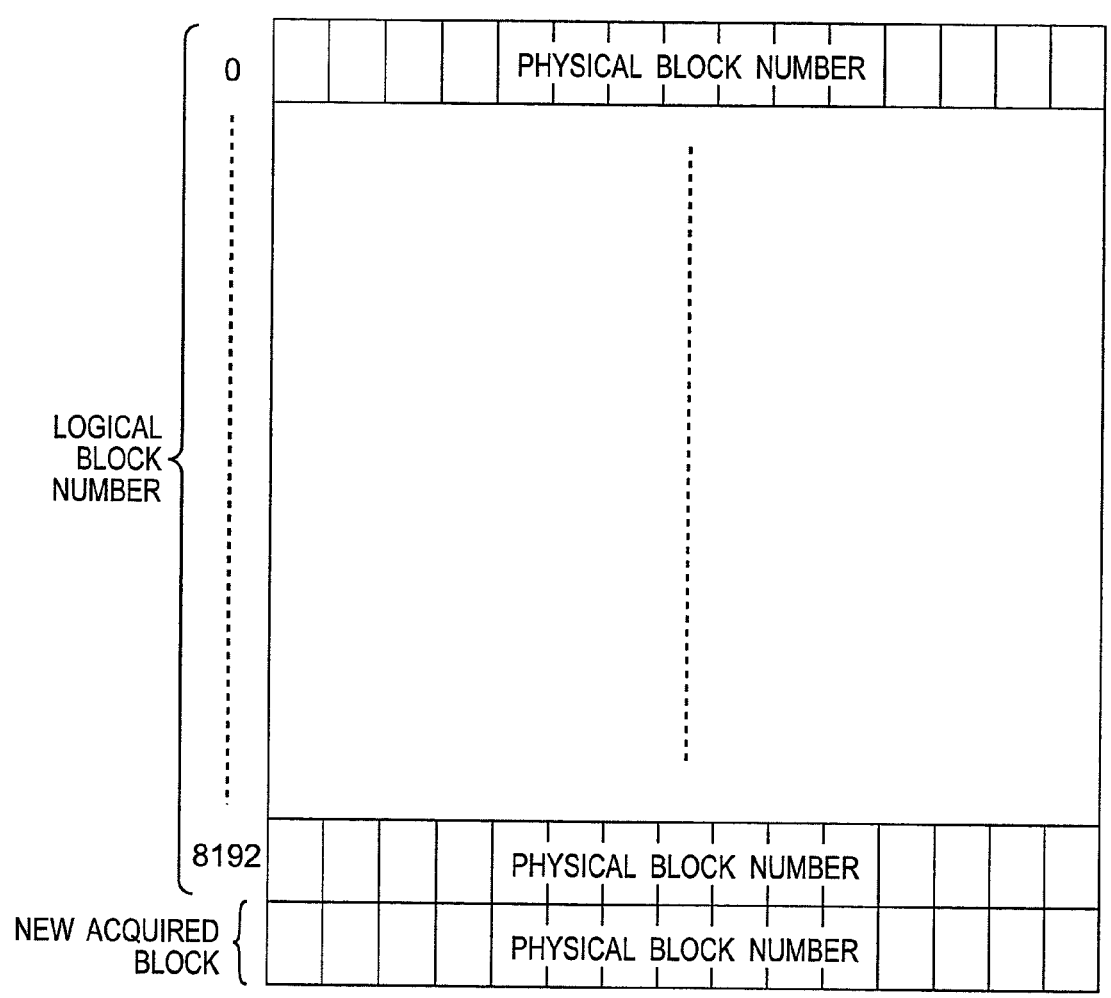
FIG. 15 shows an address conversion table in second embodiment.

FIG. 15 shows the address conversion table 1110 in the embodiment. The address conversion table 1110 is a table for converting the logical block number 1411 included in the logical address 1400 specified by the access device 100, into a physical block number 1412 in the nonvolatile memory 1115. The address conversion table 1110 shows a physical block number 1412 corresponding to each logical block number 1411. In the embodiment, the address conversion table 1110 includes the physical block numbers 1412 corresponding to all logical block numbers 1411 in the nonvolatile memory 1115. The address conversion table 1110 stores, in the final end, the new acquired physical block number depending on the write instruction from the access device 100.

FIG. 16 shows a physical area management table 1111 in the embodiment. The physical area management table 1111 is a table for showing the state of physical block 211 as erase unit in nonvolatile memory 1115, and stores the block status showing whether valid data is stored or not. The physical area management table 1111 stores the block status of all physical block numbers 1412 included in the address conversion table 1110, and the capacity of physical area management table 1111 in the embodiment is different from the capacity of physical area management table 111 in the first embodiment. Except for the capacity, the physical area management table 1111 in the embodiment is same as the physical area management table 111 in the first embodiment.

Figure 17:
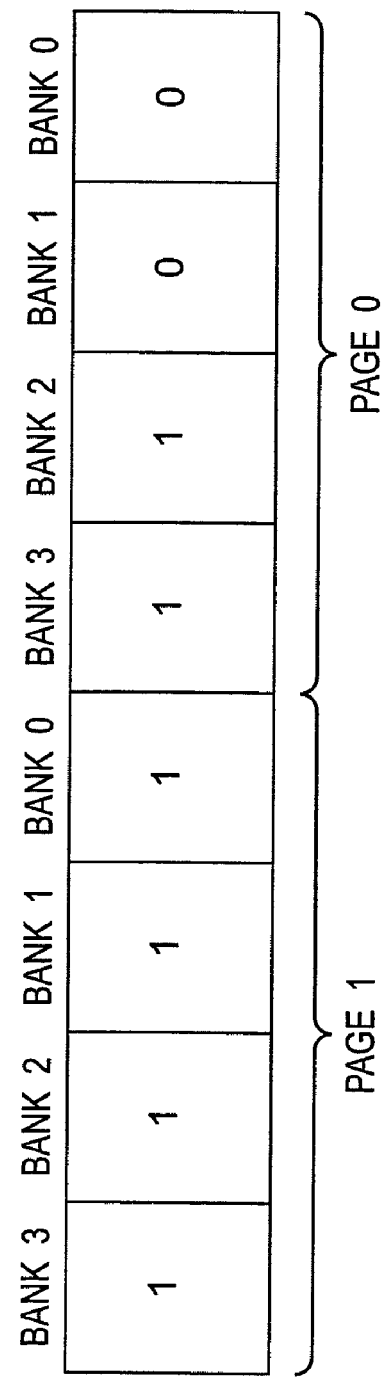
FIG. 17 shows a write management table in second embodiment.

FIG. 17 shows a write management table 1121 in the embodiment. The write management table 1121 is a table for storing the write state of physical block corresponding to the logical block as one unit to be managed by the address conversion table 1110. The write management table 1121 presents one bit showing the state of whether already written or not in each bank of page 0 and page 1, and stores "1" if not written yes, or "0" if already written. For example, according to the write instruction from the access device 100, if four physical blocks are newly assured, all bits of write management table 1121 are set to "1" of binary notation. When data is written, "0" of binary notation is set in the bit corresponding to the written page. When writing data in the page in which "0" is already set, the write management table 1121 judges if necessary or not to assure a new physical block again.

[Generation of Address Management Table]

The address management table control unit 108 shown in FIG. 11 reads in, at the time of initialization, the address conversion table 1110 and the physical area management table 1111, from the address management table area 1117 of the nonvolatile memory 1115.

The address management table generation unit 107 generates a write management table 1121 based on the distributed management information 214 stored in the physical block 211 in the address range which is accessed before turning on the power.

The read-write memory 113 is a volatile memory such as SRAM, or a nonvolatile memory such as ferroelectric memory, and temporarily stores the address management table 1112. Data writing and other operations by instruction from the access device 100 are executed while referring to and updating the address management table 1112 stored in the read-write memory 113.

The memory control unit 122 writes the data and distributed management information 214 in the user data area 116 depending on the write instruction from the access device 100. At this time, the address management table control unit 108 in the memory control unit 122 updates the address management table 1112 temporarily stored in the read-write memory 113. The address management table control unit 108 writes the address management table 1112 temporarily stored in the read-write memory 113, in the address management table area 1117 of the nonvolatile memory 1115, when the write destination address indicated by the access device 100 is changed from the present address range to other address range.

[Writing of Address Range Specifying Information]

The address range specifying information 1801 is the information for specifying the switching destination address range. FIG. 18 shows the address range specifying information 1801 in the embodiment. The address range specifying information 1801 includes time information 711, and address range number 1712 for specifying the address range after changing over. The number of bits of address range number 1712 is different from the number of bits of address range number 712 in the first embodiment.

The address range control unit 124 in FIG. 11 includes an address range switching unit 105 and an address range specifying unit 106.

The internal configuration of address range switching unit 105 is same as in the first embodiment shown in FIG. 7. The address range switching unit 105 detects whether the address range number 1712 is changed over or not based on the logical address transferred from the access device 100. When changeover is detected, the address range switching unit 105 outputs the address range number 1712 after changeover, together with the time information 711 showing the before-after relation of time of each command so that it is known that the command transferred from the access device 100 is issued at which time.

The address range specifying unit 106 stores the address range specifying information 1801 in the current address range number storage area 118 of the nonvolatile memory 1115, by way of the nonvolatile memory access unit 109, when starting writing into changed address range, right after changeover of address range. The address range specifying unit 106 further identifies the address range 1201 which is accessed before turning on the power, based on the address range specifying information 1801 stored in the current address range number storage area 118 at the time of initialization after turning on the power. Therefore, for example, when restarting after power failure or other trouble, the address range specifying unit 106 can specify the address range number 1712 accessed before restart.

[Initialization Process]

In the nonvolatile storage system having such configuration, initialization process is explained. When the power source is turned on, the CPU 102 issues, to the nonvolatile memory access unit 109, an instruction for reading the address conversion table 1110 and physical area management table 1111 in the address management table area 1117, based on the program stored in the ROM 104. Aside from the time of turning on the power source, the initialization process is also executed when resetting the nonvolatile storage device 123. The nonvolatile memory access unit 109 reads out the address conversion table 1110 and physical area management table 1111 from the address management table area 1117 of the nonvolatile memory 1115. The address management table control unit 108 writes the address conversion table 1110 and physical area management table 1111 into the read-write memory 113.

The address conversion table 1110 and the physical area management table 1111 being read in at the time of initialization are the latest address conversion table 1110 and the latest physical area management table 1111 stored in the physical blocks 211 in the address management table area 1117. In order to judge whether latest or not, it is judged whether or not the highest position address of pages in physical block 211 corresponding to address management table area 1117, specifically, the portion of 4 pages (total 8 kB) of logic address 8190_a1 to 8190_d1 in FIG. 12 is erased as a set. Searching in the direction of upper position in FIG. 12, the portion of 4 pages not erased, in which a certain value is written, is selected as the latest address conversion table 1110 and the latest physical area management table 1111.

Further, the CPU 102 issues an instruction, to the nonvolatile memory access unit 109, for reading the address range specifying information 1801. The address range specifying unit 106 searches the address range specifying information 1801 having the largest time information 711 from the current address range number storage area 118 of the nonvolatile memory 1115, by way of the nonvolatile memory access unit 109, and transfers the address range number 1712 included in the searched address range specifying information 1801 to the address management table generation unit 107. The address management table generation unit 107 generates a write management table 1121 based on the distributed management information 214 of the physical block 211 of the address range which is accessed before turning on the power, and stores the write management table 1121 on the read-write memory 113. However, the time information 711 in which all bit values are 1 is judged that address range specifying information 1801 is not written yet.

When used for the first time right after shipping of the nonvolatile memory device 123 as recording medium of nonvolatile storage system, all physical blocks 211 in the nonvolatile memory 1115 are erased. Actually, a specified value is written in the system region, but the explanation of this state is omitted. Right after shipping from factory, four pages of 8189_a0 to 8189_d0 of the lowest position (upper side in FIG. 12) are read out into the read-write memory 113 as address management table 1112. At this time, valid data is not stored in the nonvolatile memory 1115, and the physical area management table 1111 in FIG. 16 stores all "11" showing invalid blocks. The write management table 1121 shown in FIG. 17 stores all "1" showing the all unwritten state.

Thus, after writing the address conversion table 1110, physical area management table 1111, and write management table 1121 into the read-write memory 113, the memory controller 101 is ready to receive read or write command from the access device 100.

[Data Writing Process in Address Range]

Figure 19:
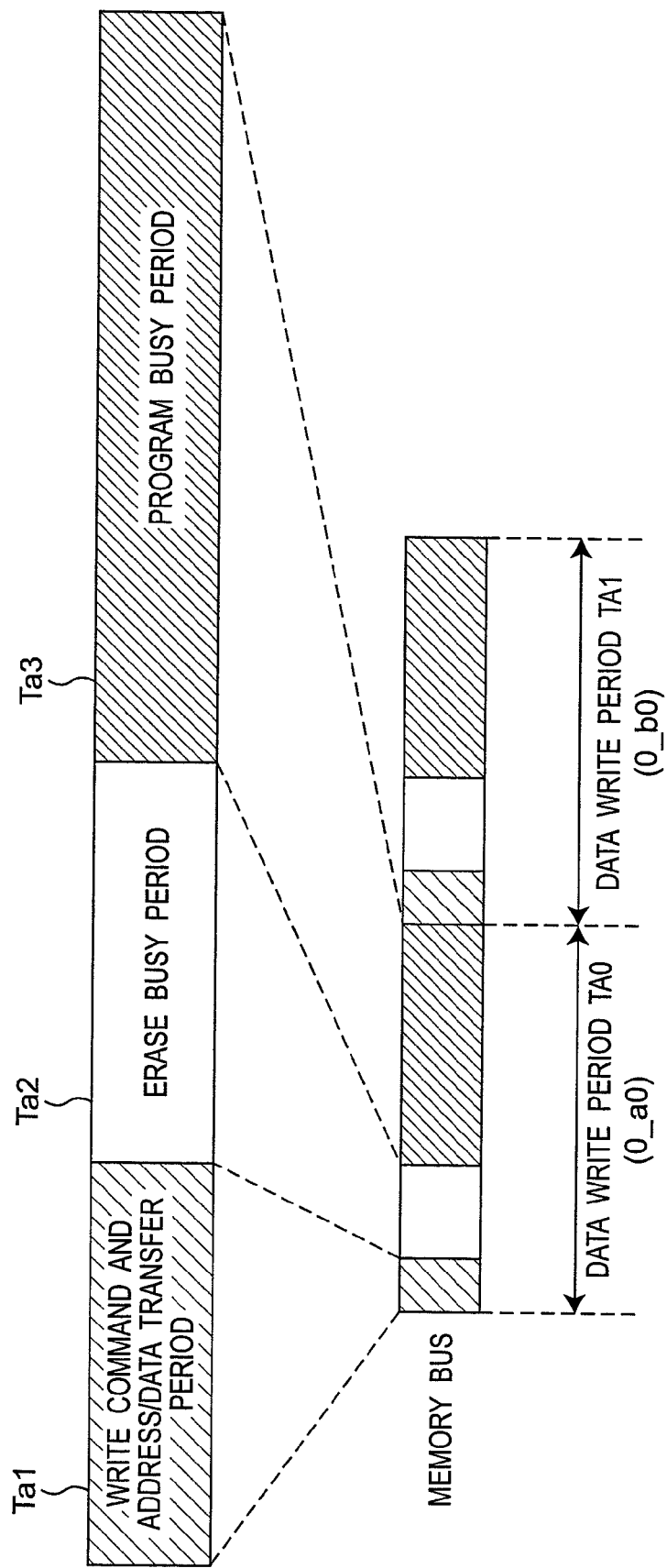
FIG. 19 is a diagram showing a write sequence when address range is not changed in second embodiment.

FIG. 19 shows a writing sequence when the address range is not changed over. In the first embodiment, the nonvolatile memory 115 is accessed by 16 kB unit, but it is accessed by 2 kB unit in this embodiment. In FIG. 19, in data write period TA0, data of 2 kB is written in page 0 of physical block 211 indicated by logical address 0_a0 in address range 0, and in next data write period TB1, data of 2 kB is written in page 0 of physical block 211 indicated by logical address 0_b0 in address range 0. The write command and address/data transfer period Ta1, erase busy period Ta2, and program busy period Ta3 are same as in the first embodiment shown in FIG. 9.

In the conventional semiconductor memory device shown in patent document 1, after writing data of 2 kB portion, the address management table 1112 temporarily stored in the read-write memory 113 is written back in the nonvolatile memory 1115, and the overhead in time has caused to decline the processing speed. In the second embodiment of the invention, however, when the address range is not changed over, the address management table 1112 temporarily stored in the read-write memory 113 is not written back in the nonvolatile memory 1115, and the distributed management information 214 is written in the user data area 1116 simultaneously with writing of data, and the overhead is rationalized.

[Data Writing Process when Address Range is Changed]

FIG. 20 shows the writing process when the address range is changed over. In FIG. 20, the address range 1201 is changed from "3" to "4". Between the data write period TA3 and the data write period TA0, an address range changeover time point TS exists.

In the data write period TA3, after data is written in page 1 of physical block 211 of 3_d1, when the address range switching unit 105 receives a logical address 1400 for specifying address range 4 from the access device 100, it detects that the address range is changed from "3" to "4". This ends processing in address range 3, and the address range changeover time point TS exists between the data write period TA3 and the data write period TA0.

In next data write period TA0, data is written in page 0 of physical block 211 of 4_a0. At this time, the address management table control unit 108 writes the physical block number 1412 assured for writing into address range "4", into a newly assured block of address conversion table 1110.

Afterward, in AT write period TB, the address conversion table 1110, the physical area management table 1111, and the write management table 1121 temporarily stored in the read-write memory 113 are stored in the address management table area 1117 of the nonvolatile memory 1115.

Next, in address range specifying information write period TD, the address range specifying information 1801 including address range "4" is written into the current address range number storage area 118 of the nonvolatile memory 1115. By this process, when restarting operation right after power failure or other trouble, it is judged that power failure or other trouble has occurred in the process of which address range.

Detail of the write command and address/data transfer period Ta1, Tb1, Td1, the erase busy period Ta2, Tb2, Td2, and the program busy period Ta3, Tb3, Td3 is same as those in the first embodiment shown in FIG. 10.

In this embodiment, at the time of initialization, since the address conversion table 1110 corresponding to all logical block numbers 1411, and the physical area management table 1111 corresponding to all physical block numbers 1412 included in the address conversion table 1110 are stored in the read-write memory 113, the AT read period TC in FIG. 10 is not needed.

Thus, in the nonvolatile storage device 123 of the embodiment, on every occasion of writing data, address management table 1112 is not written back into the nonvolatile memory 1115. Accordingly, in the event of power failure or other problem, the address management table 1112 on the nonvolatile memory 1115 may not be the latest address information. Hence, when restarting operation right after power failure or other trouble, the address range specifying unit 106 specifies the address range at the time of occurrence of power failure or other trouble, and based on the distributed management information 214 stored in the address range, the address management table generation unit 107 generates the write management table 1121 on the read-write memory 113.

[Time Required for Initialization Process]

The quantity of data read by the address management table generation unit 107 through nonvolatile memory access unit 109 is limited to the distributed management information 214 in the address range, and the data can be read in relatively in a short time. For example, if the nonvolatile memory 1115 has the multibank page read function, supposing the required time of multibank page read of each page to be 100 usec, reading is complete in about 0.8 msec according to formula (11).

$$100 \text{ usec} \times 8 = 0.8 \text{ msec} \quad (11)$$

In the case of semiconductor memory device having a capacity of 1 GB (worth of 8 flash memory chips), it is about 6.4 msec according to formula (12).

$$0.8 \text{ msec} \times 8 \text{ pieces} = 6.4 \text{ msec} \quad (12)$$

By contrast, the conventional semiconductor memory device shown in patent document 2 reads out the distributed management information in all regions, and hence the reading time is about 6400 msec according to formula (13).

$$100 \text{ usec} \times 8k \times 8 = 6400 \text{ msec} \quad (13)$$

This value is too long for the user as waiting time for starting. As the capacity of the nonvolatile memory is large, and such long time becomes a fatal problem. According to the invention, the initialization process is finished in a short time.

[Date Rewriting Rate]

Increase of writing speed is explained quantitatively below. The data write period TA0 and TA1 shown in FIG. 19, and the data write period TA3, TA0, AT write period TB and address range specifying information write period TD shown in FIG. 20 are supposed to be 1.5 msec individually. The conventional semiconductor memory device of patent document 1 requires the AT write period TB after data write period TA0, TA1 in FIG. 19, and it takes 4.5 msec in writing of data into 2 pages according to formula (14)

$$1.5 \text{ msec} \times 3 = 4.5 \text{ msec} \quad (14)$$

On the other hand, in the embodiment, when the address range is not changed, it takes 3 msec according to formula (15) when writing data in 2 pages.

$$1.5 \text{ msec} \times 2 = 3 \text{ msec} \quad (15)$$

In the embodiment, however, when the address range is changed over as shown in FIG. 20, it takes a longer processing time than in the prior art for address range specifying information write period TD.

In consideration of this background, the embodiment and patent document 1 are compared based on the rate value for rewriting all of one address range by the unit of 2 kB. In the embodiment, the capacity of one address range is 16 kB. In case of rewriting one address range by 2 kB unit, the access device 100 instructs writing 8 times according to formula (16).

$$16 \text{ kB}/2 \text{ kB} = 8 \text{ times} \quad (16)$$

In the conventional semiconductor memory device of patent document 1, the rewriting rate is 444 kB/sec in average as shown in formula (17)

$$16 \text{ kB}/(8 \text{ times} \times 4.5 \text{ msec}) = \text{approx. } 444 \text{ kB/sec} \quad (17)$$

On the other hand, in the nonvolatile storage device 123 in the embodiment, the rewriting rate is 593 kB/sec in average as shown in formula (18), and the nonvolatile storage device 123 in the embodiment can rewrite faster than the conventional semiconductor memory device.

$$16 \text{ kB}/\{(8 \text{ times} \times 3 \text{ msec}) + (2 \text{ times} \times 1.5 \text{ msec})\} = \text{approx. } 593 \text{ kB/sec} \quad (18)$$

Momentary speed deterioration when changing over the logical address range is in several milliseconds order, and it can be absorbed sufficiently by using the buffer generally provided in the access device 100 side. Hence, the processing is not disturbed.

Thus, according to the embodiment, if the memory capacity of the semiconductor device increases, the initialization time when starting after occurrence of power failure or other trouble can be minimized, and the overhead of time when updating the address management table 1112 can be rationalized, and hence the rewriting rate is improved.

Instead of FIG. 20, by using the writing sequence shown in FIG. 21, processing may be done when the address range is changed over. In FIG. 21, the AT write period TB is provided after the data write period TA3, and an address range changeover time point TS exists between the AT write period TB and the data write period TA0.

The management area 213 in FIG. 13 may store time information 711 in addition to distributed management information 214 and the like. Accordingly, based on information of only the physical block coinciding with the time information 711 of address range specifying information 1801 stored in the current address range number storage area 118 in FIG. 12, by revising the latest address management table 1112 stored in the address management table area, the true newest address management table 1112 can be generated.

The read-write memory 113 is not limited to RAM, and may also include other read-write memory as far as access at relatively high speed is possible.

The nonvolatile memory 1115 may be one flash memory chip or incorporate a plurality of flash memory chips. The nonvolatile memory 1115 may be also other nonvolatile memory than flash memory.

Instead of physically fixing the storage position of address management table 1112 as the address management table area 1117 in the embodiment, pointer information showing physical address of region for address management information may be separately provided, and the address management table 1112 is provided in the same region as the user data area 116, so that the storage position may be moved depending on the pointer information.

The address range specifying information 1801 for specifying the address range such as time information 711 is stored in the current address range number storage area 118 of the nonvolatile memory 1115, but other nonvolatile memory may be provided aside from the nonvolatile memory 1115, and it may be stored in this memory.

The address range specifying information 1801 may be written back to the nonvolatile memory 1115 in a form of being assembled in the address management table 1112 corresponding to the address range after changeover when the address range is changed over. In this case, in initialization after turning on the power, the latest address management table 1112 corresponding to all address ranges 0 to 8188 in the address management table area 1117 is investigated, and the address range number 1712 stored in the address management table 1112 including the newest time information 711 is judged to be the address range number 1712 at the time of power failure. The address range number 1712 at the time of changeover written herein may be specified to be the address range number 1712 to which the access device 100 has transferred the writing instruction or the like at the time of occurrence of power failure or other trouble.

INDUSTRIAL APPLICABILITY

The nonvolatile storage device of the invention has effects of realizing both high speed writing and initialization time shortening by using storage medium such as memory card using flash memory or other nonvolatile memory, and is very useful as recording medium for portable AV appliances such as still picture recording and reproducing device and moving picture recording and reproducing device, or portable communication appliances such as cell-phones.

The invention claimed is:

1. A nonvolatile storage device that stores data based on at least one of a read command and a write command and a logical address sent from an access device, the nonvolatile storage device comprising:

a nonvolatile memory having a plurality of physical blocks; and a memory controller that controls one of writing data to the nonvolatile memory and reading data from the nonvolatile memory, the memory controller including a read-write memory which stores a current address management table, wherein the nonvolatile memory includes a plurality of address ranges, each of the plurality of address ranges including:

a user data area for storing the data; and an address management table area that stores an address management table, the address management table managing a correspondence relationship between a physical address of the user data area and the logical address sent from the access device;

the nonvolatile memory further including a current address range number storage area for storing an address range specifying information, the address range specifying information indicating an address range currently being accessed by the memory controller, wherein, when the memory controller receives at least one of the read command and the write command and the logical address sent from the access device, the memory controller writes data and distributed management information related to the logical address to a user data area of the address range currently being accessed, and the memory controller updates the current address management table stored in the read-write memory, wherein when the memory controller switches the address range being accessed in response to receiving the at least one of the read command and the write command and the logical address sent from the access device, the memory controller writes the current address management table stored in the read-write memory to a first address management table area corresponding to an address range before the switching, reads a second address management table from a second address management table area corresponding to an address range after the switching, writes the second address management table to the read-write memory as a current address management table, and updates the address range specifying information to indicate the address range after the switching, wherein, during initialization, the memory controller reads distributed management information from a user data area of an address range specified by the address range specifying information stored in the current address range number storage area, generates an address management table based on the read distributed management information, and writes the generated address management table to the read-write memory as a current address management table.

2. The nonvolatile storage device according to claim 1, wherein the distributed management information includes:

a logical block number specified by the logical address sent from the access device; and a block status that shows a status of a physical block that corresponds to the logical address.

3. A nonvolatile storage device that stores data based on at least one of a read command and a write command and a logical address sent from an access device, the nonvolatile storage device comprising:

a nonvolatile memory having a plurality of physical blocks; and a memory controller that controls one of writing data to the nonvolatile memory and reading data from the nonvolatile memory, the memory controller including a read-write memory which stores a current address management table, wherein, when the memory controller switches an address range being accessed in response to receiving the at least one of the read command and the write command and the logical address sent from the access device, the memory controller writes the current address management table stored in the read-write memory to a first address management table area corresponding to an address range before the switching, reads a second address management table from a second address management table area corresponding to an address range after the switching, writes the second address management table to the read-write memory as a current address management table, and writes, to a current address range number storage area, address range specifying information that indicates the address range after the switching, wherein, during initialization, the memory controller reads distributed management information from a user data area of an address range specified by the address range specifying information stored in the current address range number storage area, generates an address management table based on the read distributed management information, and writes the generated address management table to the read-write memory as a current address management table, wherein the address range specifying information includes:

a time information identifying a before-after relation of the time of the switching; and an address range number of the address range after the switching.

* * * * *